(12) United States Patent
Kuroyanagi et al.

(10) Patent No.: US 7,043,158 B1
(45) Date of Patent: May 9, 2006

(54) OPTICAL PATH CROSSCONNECT SYSTEM WITH HIGH EXPANDING CHARACTERISTIC

(75) Inventors: Satoshi Kuroyanagi, Kawasaki (JP); Tetsuya Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/467,972

(22) Filed: Dec. 21, 1999

(30) Foreign Application Priority Data

Dec. 25, 1998 (JP) .......................................... 10-368805

(51) Int. Cl.
*H04B 10/08* (2006.01)
*H04J 14/00* (2006.01)

(52) U.S. Cl. .............................. 398/56; 398/45; 398/50; 398/55; 398/19

(58) Field of Classification Search ................. 359/124, 359/127, 128, 117, 139; 398/45, 50, 56, 19, 398/55
See application file for complete search history.

(56) References Cited

U.S. PATENT DOCUMENTS

| | | | | |
|---|---|---|---|---|
| 5,005,166 A | * | 4/1991 | Suzuki et al. ................... 370/1 |
| 5,194,977 A | * | 3/1993 | Nishio ........................ 359/128 |
| 5,457,556 A | | 10/1995 | Shiragaki .................... 359/117 |
| 5,627,925 A | * | 5/1997 | Alferness et al. ............. 385/17 |
| 5,959,748 A | * | 9/1999 | Jahreis ........................ 398/56 |
| 6,005,698 A | * | 12/1999 | Huber et al. ................. 359/117 |
| 6,072,610 A | * | 6/2000 | Kuroyanagi et al. ......... 359/117 |
| 6,097,517 A | * | 8/2000 | Okayama ....................... 398/1 |
| 6,115,517 A | * | 9/2000 | Shiragaki et al. ............. 385/24 |

FOREIGN PATENT DOCUMENTS

| | | |
|---|---|---|
| JP | 01-185093 | 7/1989 |
| JP | 06-303192 | 10/1994 |

OTHER PUBLICATIONS

Notice Of Reason For REjection dated Mar. 16, 2004 in corresponding Japanese Patent Application Hei Application No. 10-368805 (and English Translation).

* cited by examiner

*Primary Examiner*—M. R. Sedighian
(74) *Attorney, Agent, or Firm*—Staas & Halsey LLP

(57) ABSTRACT

An optical path cross-connect device includes a wavelength branching unit, an intra office signal input unit, "m" pieces of routing units, a wavelength combining unit and an intra-office signal output unit. The routing units input there into an optical signal outputted from either of the wavelength branching unit and the intra-office signal input unit via a first optical path group, and convert an input optical signal into a predetermined wavelength to thereby output a wavelength-converted optical signal to a second optical path group. The "m" (symbol being an integer and also being larger than 1)" pieces of routing units are subdivided into units of at least "n (symbol "n" being an integer and also being larger than 1)" wavelengths, as wavelength ranges to be processed by the respective routing unit are different from each other.

4 Claims, 22 Drawing Sheets

※ THE WAVELENGTHS ARE ALLOCATED IN THE LINK-BY-LINK BASIS IN THE SELECTED SUB-NETWORK BETWEEN THE SENDER AND THE RECEIVER NODES WITH RESPECT TO THE OPTICAL PATH IN THE NETWORK

FIG. 19
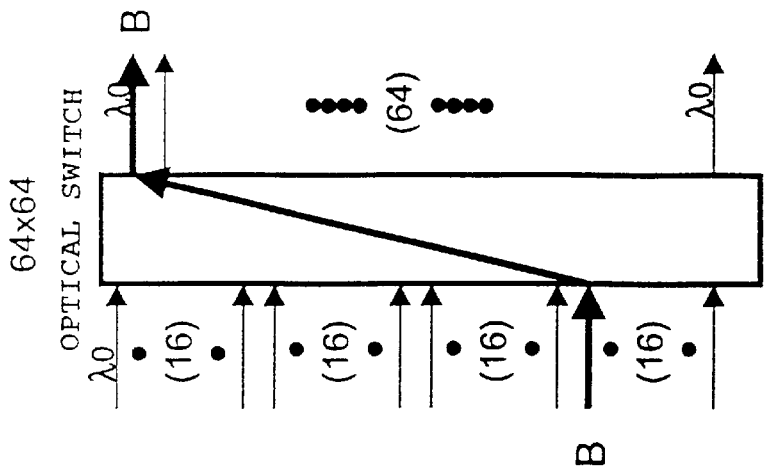
(a) INTRA-OFFICE SIGNAL INPUT UNIT
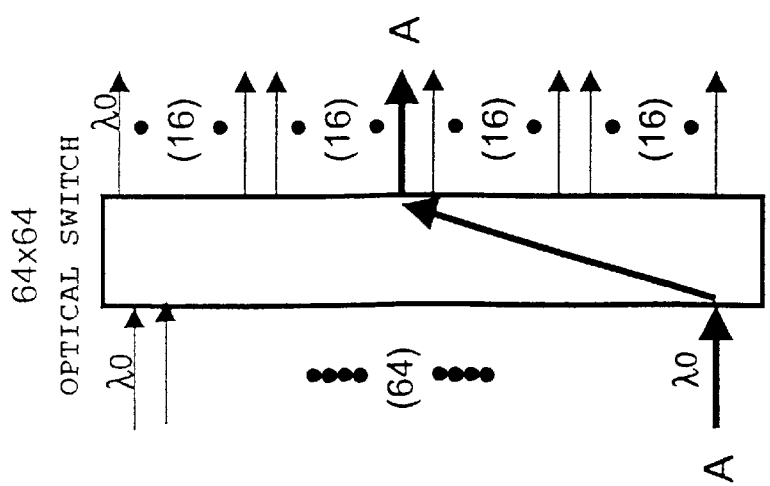
(b) INTRA-OFFICE SIGNAL OUTPUT UNIT

OPTICAL PATH CROSSCONNECT SYSTEM WITH HIGH EXPANDING CHARACTERISTIC

BACKGROUND OF THE INVENTION

1. Field of the Invention

The present invention relates to an effective technique applied to an arrangement of an optical path cross-connect system used to construct a large-scaled optical network in correspondence with an increase in a total number of wavelengths.

2. Description of the Related Art

Very recently, while large amounts of information are communicated in high speeds, very broad band networks as well as very wide range transfer systems with large capacities are required. As one of means capable of realizing such needs, a WDM-technique based optical network is desirably constructed. A core device required when such an optical network is constructed corresponds to an optical path cross-connect (optical XC).

FIG. 1 illustratively shows a typical structural example of an optical XC system and an optical network. As indicated in this drawing, the optical path cross-connect (XC) device is such a device which contains a plurality of input/output optical transmission lines, and routes wavelength-division multiplexed optical signals which are entered from the input optical transmission line into a desirable output optical transmission line wavelength-by-wavelength When a long distance transmission line is constructed, an optical amplifier is inserted to the optical transmission lines between the optical XC device, and the optical XC device is connected to another communication device (for example, electric cross connect: electric XC) through the intra-office optical transmission lines. Then, these devices are controlled by an operation system for managing the entire network.

On the other hand, a total number of wavelengths is rapidly increased in an optical network in connection with an increase of traffic capacity. However, when a total number of wavelengths is increased, a system scale required for the optical XC device is increased, which may cause a practical difficulty.

In the optical XC system, there are two different types, i.e., a wavelength fixing type XC system in which a wavelength is not converted within a node; and a wavelength converting type XC system in which a wavelength is converted within a node, if required. FIG. 2(a) and FIG. 2(b) represent general structures of the respective wavelength fixing/converting type XC systems with employment of optical switches. The wavelength fixing type XC system indicated in FIG. 2(b) is constituted by a wavelength-division demultiplexer, an optical switch unit, and a wavelength-division multiplexer. Since the optical switch is controlled in this wavelength fixing type XC system, an input optical signal is routed to a desirable output transmission line while keeping the wavelength thereof unconverted.

On the other hand, the wavelength converting type XC system indicated in FIG. 2(a) requires a wavelength converter used to convert the wavelength (note that output wavelength is fixed), as compared with the above-explained wavelength fixing type XC system, and also controls the optical switch in order to convert the wavelength of this input optical signal into a desirable wavelength of a desirable output transmission line.

It should be understood that as an example of the wavelength converter, there are provided two different converting systems, namely a wavelength of an input optical signal is directly converted into a desirable wavelength while maintaining the optical signal form by utilizing an optical semiconductor element, and a wavelength of an input optical signal is converted into a desirable wavelength by using both an optical/electric converter and an electric/optical converter. Also, as an example of the optical switch, there are provided a dielectric element such as LiNbO3, an optical semiconductor element such as InP and GaAs, a sillica-based waveguide switch realized by utilizing the thermo-optic effect, and a mechanical optical switch realized by utilizing a stepper motor and a prism. Furthermore, as an example of the wavelength-division demultiplexer and the wavelength-division multiplexer, such elements may be employed which use an array waveguide grating and a dielectric multilayer film.

FIG. 3 is a conceptional view indicating an optical path network in such an optical network established when the conventional optical XC device indicated in FIG. 2 is employed.

As shown in FIG. 3(a), in the wavelength converting type optical path network, a wavelength is allocated in a link-by-link basis between a sender and a receiver node with respect to a single optical path. In other words, a wavelength is converted with respect to each of repeating optical XC device, if required.

On the other hand, as shown in FIG. 3(b), in the wavelength fixing type optical path network, a single wavelength is allocated between a sender and a receiver node with respect to a single optical path. In other words, the wavelength is not converted within a repeating optical XC device.

In this case, the below-mentioned problems occur, comparing the wavelength fixing type optical path network with the wavelength converting type optical path network.

That is, in the wavelength fixing type optical path network, when the optical signal having the same wavelength as that of the wavelength-multiplexed optical signal which is entered from the input optical transmission line is routed to the same output optical transmission line, blocking will occur.

On the other hand, since the wavelengths can be converted in the wavelength converting type optical path network if necessary, even when the optical signals having the same wavelengths are routed to the same output transmission line, the optical signal can be routed without any occurrence of such blocking. However, a large-scaled optical switch is required, as compared with that of the wavelength fixing type optical path network. Furthermore, in the wavelength converting type optical path network, when a total number of wavelengths is increased, the scale of the optical switch must be enlarged (namely, this optical switch must be replaced by another large-scaled optical switch). As a consequence, the wavelength converting type optical path network is not superior in the expanding characteristic with respect to a total number of wavelengths. To the contrary, in the wavelength fixing type optical path network, a total number of optical switches may be increased, depending upon an increase of wavelength number.

In summary, there are the following problems that the transfer characteristic (blocking characteristic) is deteriorated in the wavelength fixing type optical path network, whereas the wavelength converting type optical path network has no expanding characteristic with respect to increasing of the wavelength number, and the scale of the entire device is enlarged.

The present invention has been made in view of such problems, and therefore, has an object to realize an optical path cross connect technique with a high expanding characteristic with respect to an increase in a total number of wavelengths, while maintaining a better transfer characteristic.

SUMMARY OF THE INVENTION

To achieve the above-described object, according to a first means of the present invention, there is provided an optical XC device in which an Optical transmission line (inter-office) allows a multiplexed wavelength and an optical transmission line (intra-office) employs a non-multiplexed wavelength, a wavelength separating means is provided every transmission line (inter-office), and also, an intra-office signal input means is provided so as to demultiplex a wavelength-multiplexed optical signal entered from the transmission line (inter-office) to a first optical path group, and repeat a wavelength-non-multiplexed signal to the first optical path group. Then, this optical XC device is provided with "m" pieces of routing means for inputting thereinto an optical signal via this first optical path group, and for converting this optical input signal into a predetermined wavelength to thereby output the wavelength-converted optical signal to a second optical path group. The "m" (symbol "m" being an integer and also being larger than 1)" pieces of routing means are subdivided in a unit of at least "n" (symbol "n" being an integer and also being larger than 1)" wavelengths.

Furthermore, there are provided a wavelength combining means for selectively wavelength-multiplexing the optical signal through the second optical path group, and an intra-office signal output means for selectively repeating the optical signal at a post stage of the above-explained routing means.

It should be noted that in the first means, the intra-office signal input means can be constituted by an optical space switch, the routing means can be arranged by an optical space switch and a wavelength converter, and the intra-office signal output means can be arranged by an optical space switch.

Also, a regenerator constructed of both an opto-electric converter and an electric-optical converter may be inserted at any one of an input of the optical space switch or an output thereof.

Also, a plurality of the optical path cross-connect devices according to the first means may be employed so as to construct an optical network.

As previously explained in detail, a single sub-network is constituted by the wavelength converting type routing means in the unit of extension. Then, the wavelength converting type routing means are successively added in response to an increase in the wavelength numbers (namely, a plurality of sub-networks are additionally provided) so as to constitute a large-scaled optical XC device and an optical network. In this case, the wavelength ranges to be processed by the respective routing means are made different from each other.

As a consequence, while maintaining the transfer characteristic, the present invention is provided with the expanding characteristic with respect to the wavelength number. Furthermore, it can prevent the large-scaled system. This may contribute to an improvement in the performance of the optical transfer system with employment of this arrangement.

According to a second means of the present invention, in the above-explained first means, the optical signal transferred to the transmission line (intra-office) is wavelength-multiplexed, and both the intra-office signal input means and the intra-office signal output means repeat the wavelength-multiplexed optical signal.

It should also be noted that the intra-office signal input means can be arranged by a wavelength-division demultiplexer, and an optical space switch; the routing means can be constituted by an optical space switch and a wavelength converter; and the inter-office signal output means can be arranged by an optical space switch, a wavelength converter, and a wavelength-division multiplexer.

According to a third means of the present invention, there is provided an optical XC device in which an optical transmission line (inter-office) allows a multiplexed wavelength and an intra-office transmission line employs a non-mulitplexed wavelength, an optical branching means is provided with each of the optical transmission line (inter-office), for branching a wavelength-multiplexed optical signal into "m (symbol "m" being an integer and also being larger than 1)" pieces of first optical path groups, while maintaining the wavelength-multiplexed state; and an intra-office signal input means is provided with each of the intra-office transmission line for repeating a wavelength-non-multiplexed optical signal entered from this intra-office transmission line.

Furthermore, the third means is provided with "m" pieces of routing means for routing an optical signal within a pre-allocated wavelength range from optical signals outputted from the optical branching means and the intra-office signal input means to an inter-office signal output unit, and for converting the optical signal within the pre-allocated wavelength range into a desirable wavelength to route the wavelength-converted optical signal to a second optical path group, and the "m (symbol "m" being an integer and also being larger than 1)" pieces of routing means are subdivided in a unit of at least "n (symbol "n" being an integer and also being larger than 1)" wavelengths. Furthermore, there are provided a wavelength combining means for selectively wavelength-multiplexing the optical signal, and an intra-office signal output means for selectively repeating the optical signal at a post stage of the above-explained routing means.

It should also be noted that the intra-office signal input means can be constituted by an optical space switch; the routing means can be arranged by a wavelength-division demultiplexer, an optical space switch, a wavelength converter and a wavelength-division multiplexer; and the intra-office signal output means can be arranged by an optical space switch.

According to a fourth means of the present invention, in the above-explained third means, the optical signal transferred to the optical transmission line (intra-office) is wavelength-multiplexed, and both the intra-office signal input means and the intra-office signal output means repeat the wavelength-multiplexed optical signal.

It should be understood that the intra-office signal input means can be constituted by a wavelength-division demultiplexer and an optical space switch; the routing means can be arranged by a wavelength-division demultiplexer, an optical space switch, a wavelength converter and a wavelength-division multiplexer; and the inter-office signal output means can be arranged by an optical space switch, a wavelength converter and a wavelength-division multiplexer.

BRIEF DESCRIPTION OF THE DRAWINGS

For a better understanding of the present invention, reference is made of a detailed description to be read in conjunction with the accompanying drawings, in which:

FIG. 19 is an explanatory diagram (1) for explaining the switching operation of an optical switch according to the embodiment 1;

DETAILED DESCRIPTION OF THE PREFERRED EMBODIMENTS

Referring now to drawings, various preferred embodiments of the present invention will be described in detail.

Arrangement of First Optical XC Device

Figure 1:
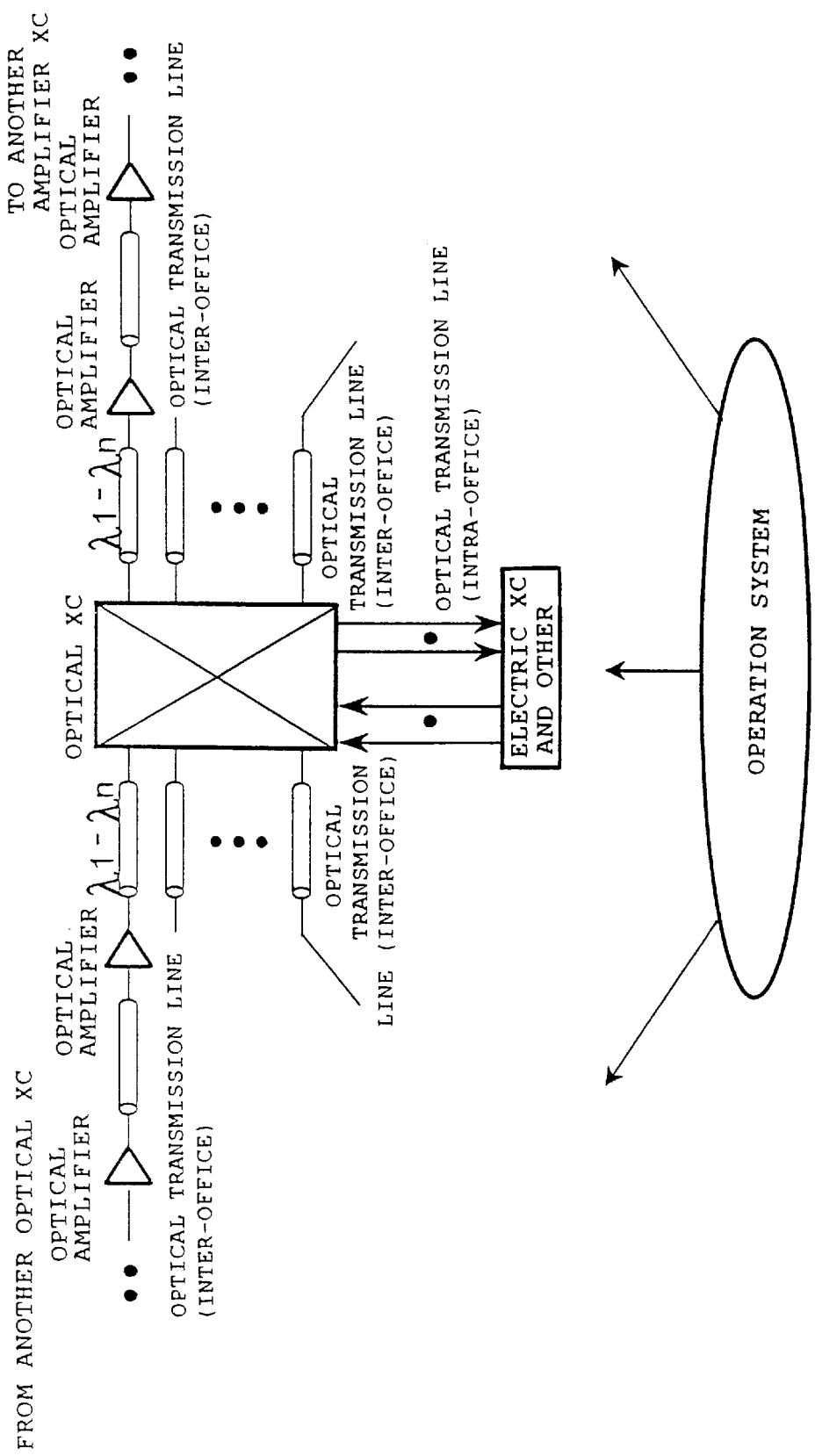
FIG. 1 is a diagram illustratively showing a typical optical path cross-connect device system and a typical optical network.
Figure 2:
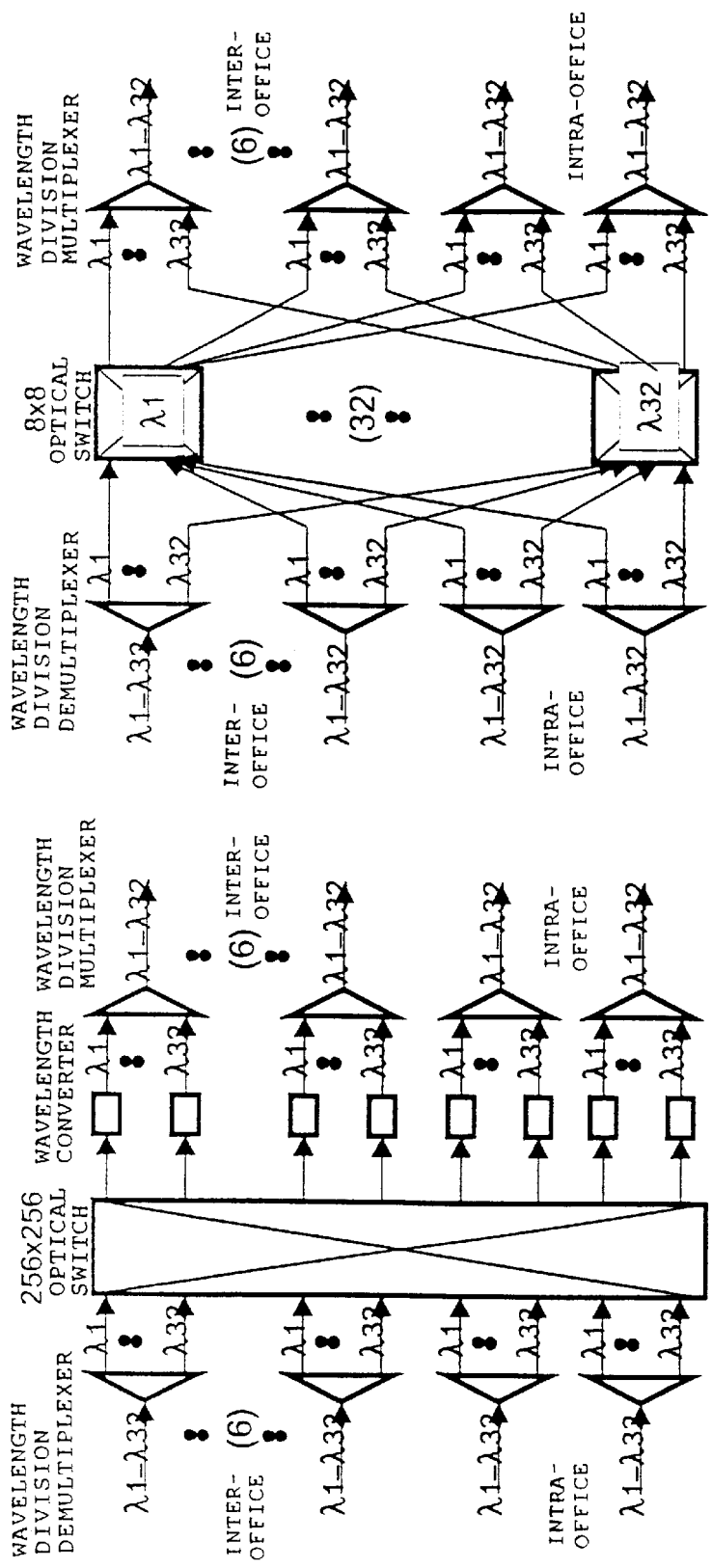
FIG. 2 is a node structural diagram of a typically conventional optical XC device.
Figure 3:
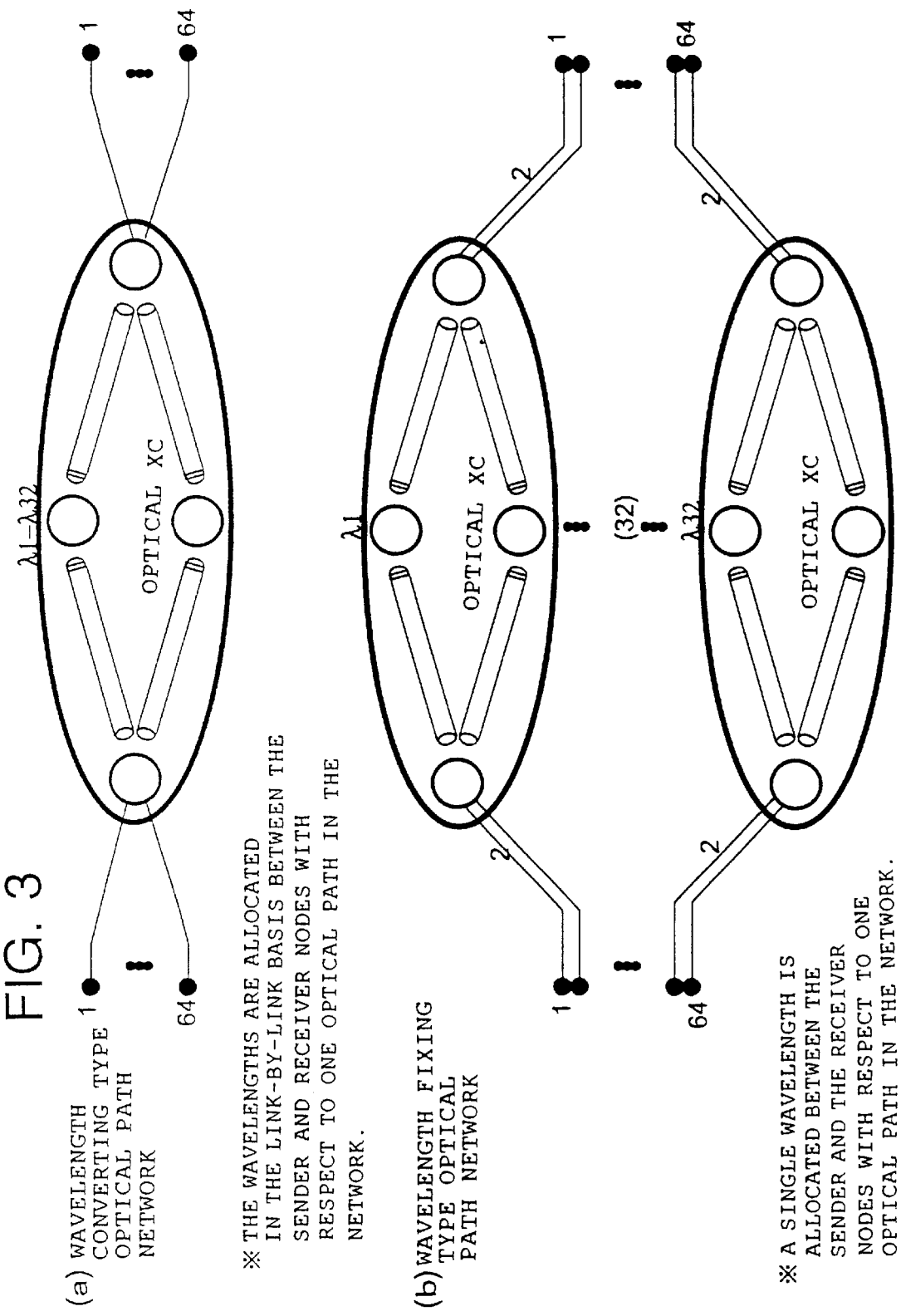
FIG. 3 shows an optical path network diagram in the case that the conventional optical XC device is employed.
Figure 4:
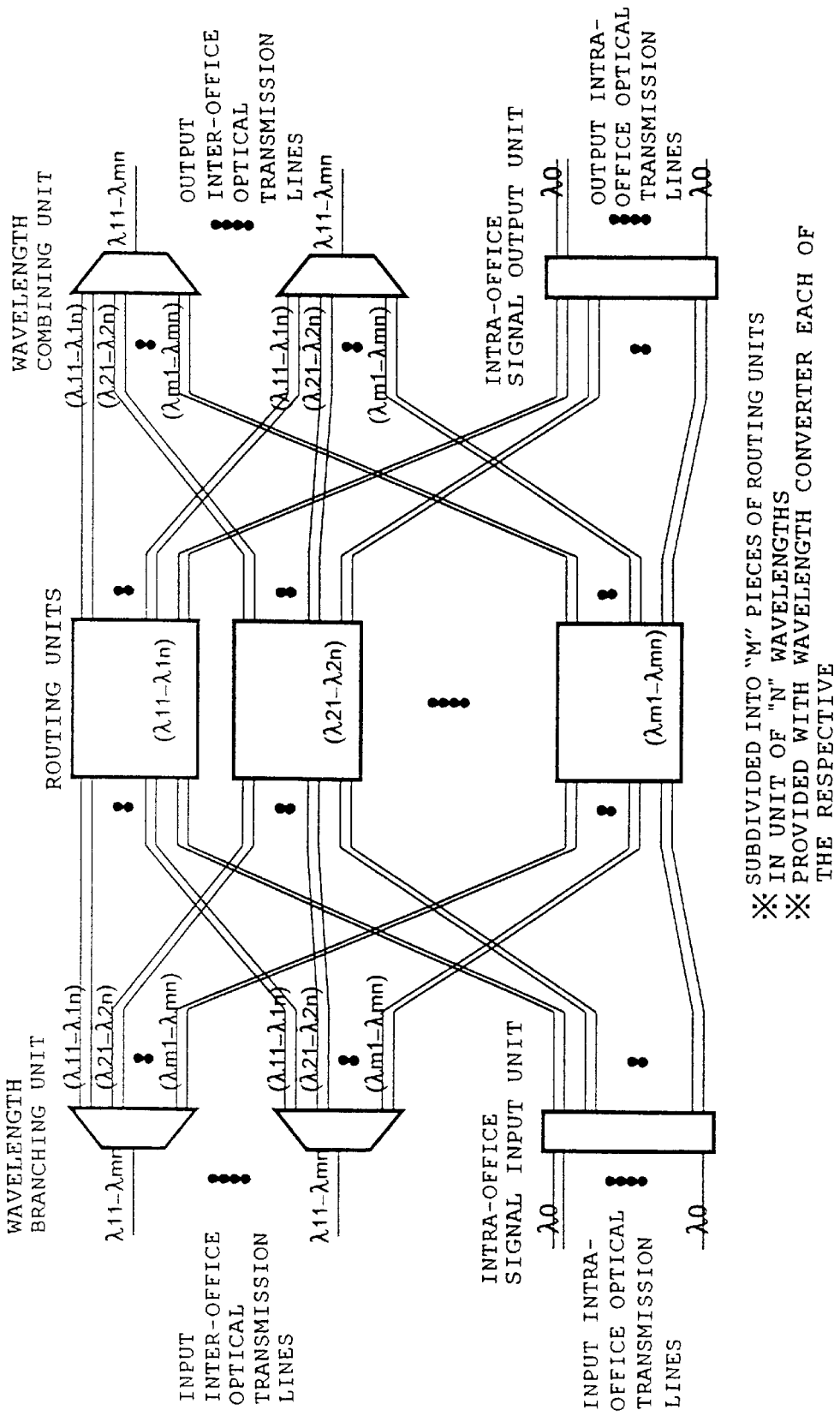
FIG. 4 illustratively shows a basic structural diagram of an optical XC device according to an embodiment 1 of the present invention.
Figure 8:
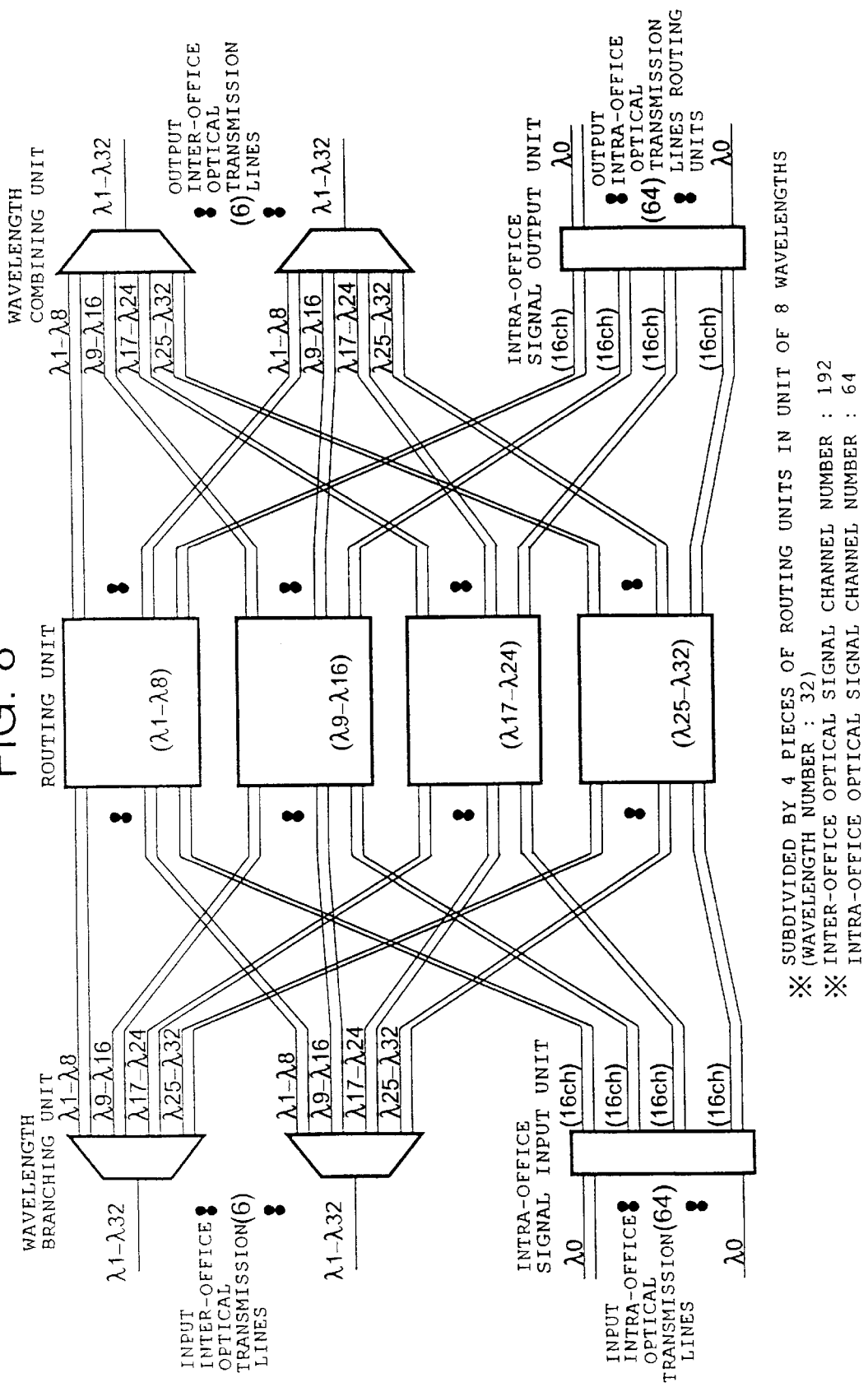
FIG. 8 is a concrete structural diagram explaining the routing operation by the optical XC device of the embodiment 1.

FIG. 4 illustratively indicates an arrangement of an optical XC device according to an embodiment 1 of the present invention. Also, FIG. 8 represents a concrete routing operation of this first optical XC device.

In this drawing, a wavelength branching unit is provided every optical transmission line between input offices. An optical signal having a multiplexed wavelength defined from "$\lambda 11$" to "$\lambda mn$" is inputted into this wavelength branching unit. This wavelength branching unit demultiplexes the above-described multiplexed wavelength to distribute the separated wavelengths to the respective optical path groups ($\lambda 11$ to $\lambda 1n$), ($\lambda 21$ to $\lambda 2n$), - - -, ($\lambda m1$ to $\lambda mn$). Then, this wavelength branching unit inputs these separated optical signals of the optical path groups into routing units.

The routing unit constituted by "m" pieces of routing units is subdivided in a unit of "n" wavelengths, and the subdivided routing units perform routing process operations. This routing unit is arranged by an optical space switch and a wavelength converter.

An intra-office signal input unit has the following functions. That is, non-multiplexed wavelength signals supplied from an optical transmission line between input offices are repeated and then distributed to "m" pieces of routing units.

FIG. 8 represents a detailed explanatory diagram of these functions. As indicated in this drawing, in this embodiment 1, a total number of wavelengths appearing on the input side is selected to be 32, these 32 wavelengths are distributed into 4 sets of routing units in a unit of 8 wavelengths. Also, a ratio of optical signal channel number derived from an optical transmission line (inter-office) to optical signal channel number derived from an intra-office transmission line is selected to be 3:1. As a result, a total channel number of the optical signals (inter-office) is equal to 32×6=192, and a total channel number of the intra-office optical signals is equal to 32×2=64.

It should be noted that this intra-office signal input unit may be constructed by an optical space switch.

Figure 22:
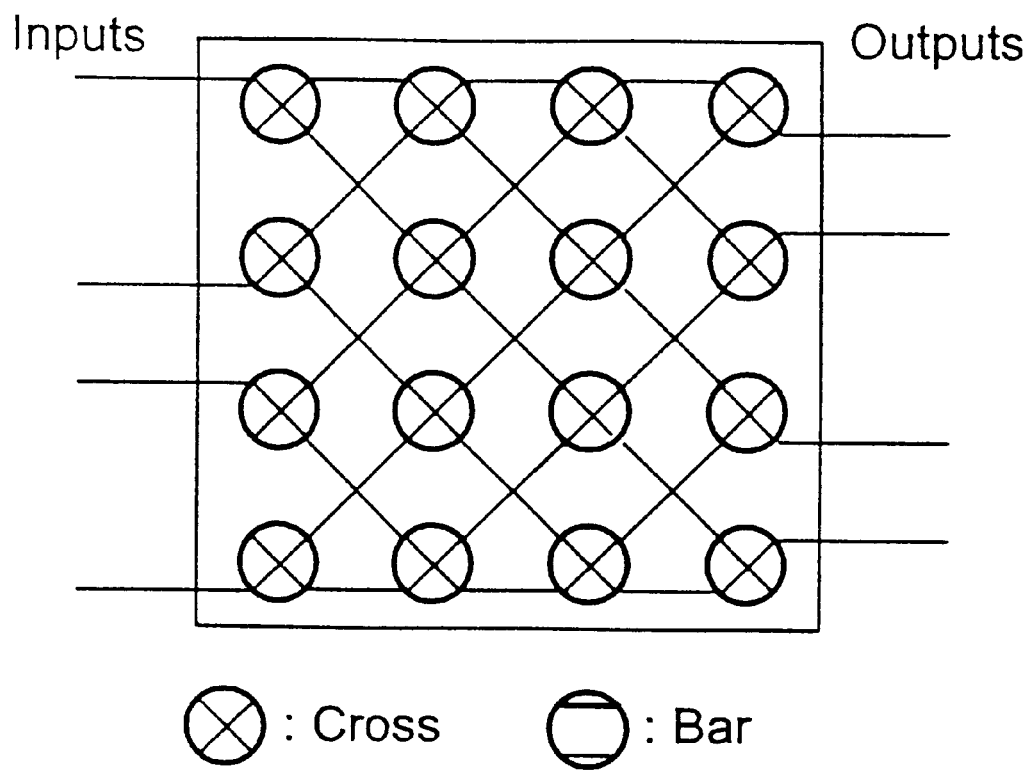
FIG. 22 is a structural diagram of an optical space switch employed in the embodiment.

FIG. 22 indicates a structural example of an optical space switch (4×4). Similarly, as apparent from this structural example, the hardware scale of this optical space switch is increased in accordance with a product of quantities of input/output ports. For instance, in the case of 4×4, 16 sets of 2×2 optical switches are required.

Figure 12:
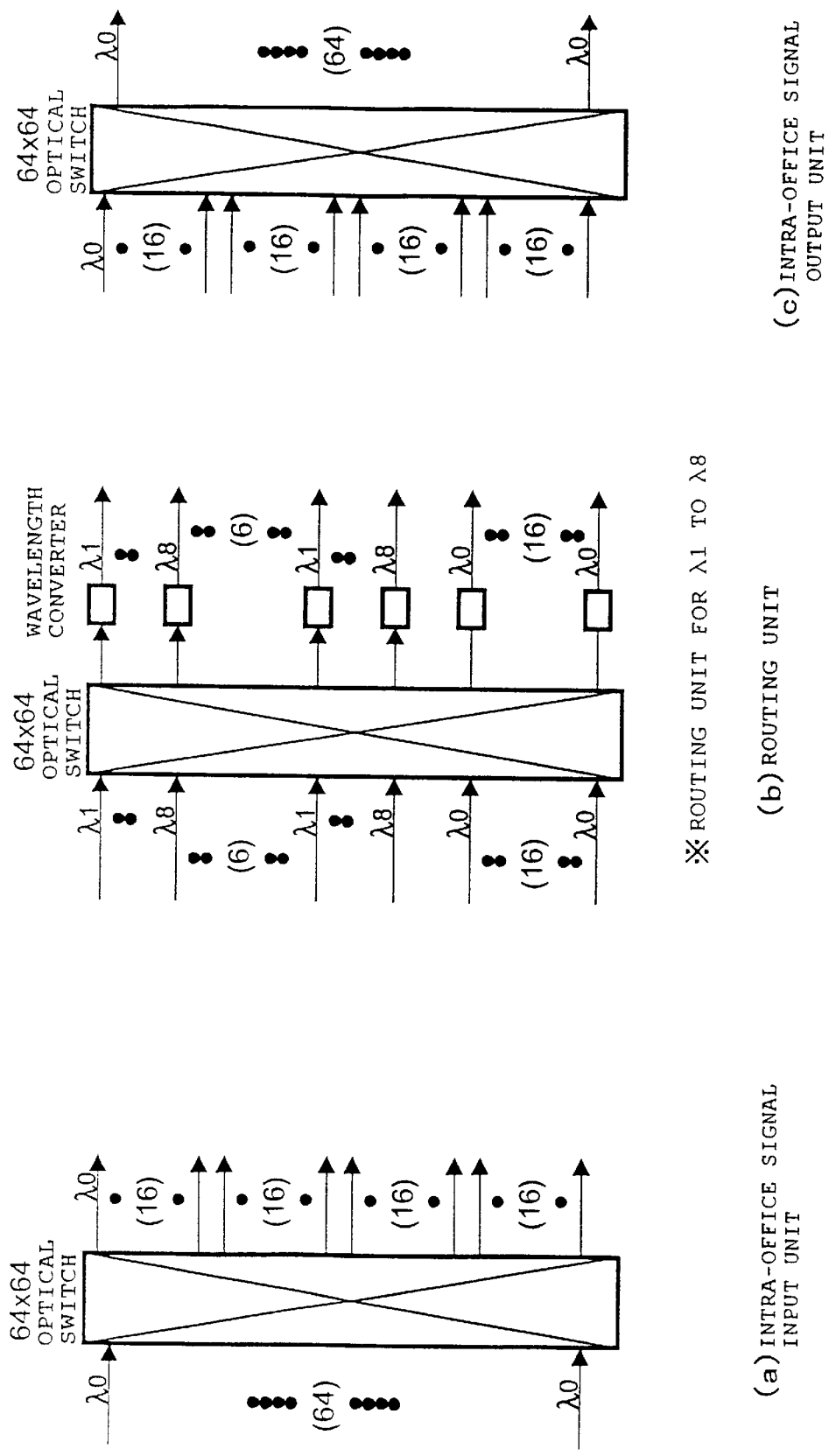
FIG. 12 illustratively represents structural drawings of the respective units employed in the optical XC device of the embodiment 1.

FIG. 12 indicates an arrangement of this intra-office signal input unit, an arrangement of the routing unit, and an arrangement of the intra-office signal output unit. The intra-office signal input unit is constituted by 64×64 optical switches. The routing unit is arranged by 64×64 optical switches and wavelength converters. In the wavelength converters, the output wavelengths of the optical signals sent out to the optical transmission line between the output offices correspond to the wavelengths allocated to the respective routing units, and all of the output wavelength of the optical signals sent out to the intra-office optical transmission line are equal to each other. The intra-office signal output unit is constituted by 64 64 optical switches.

Figure 16:
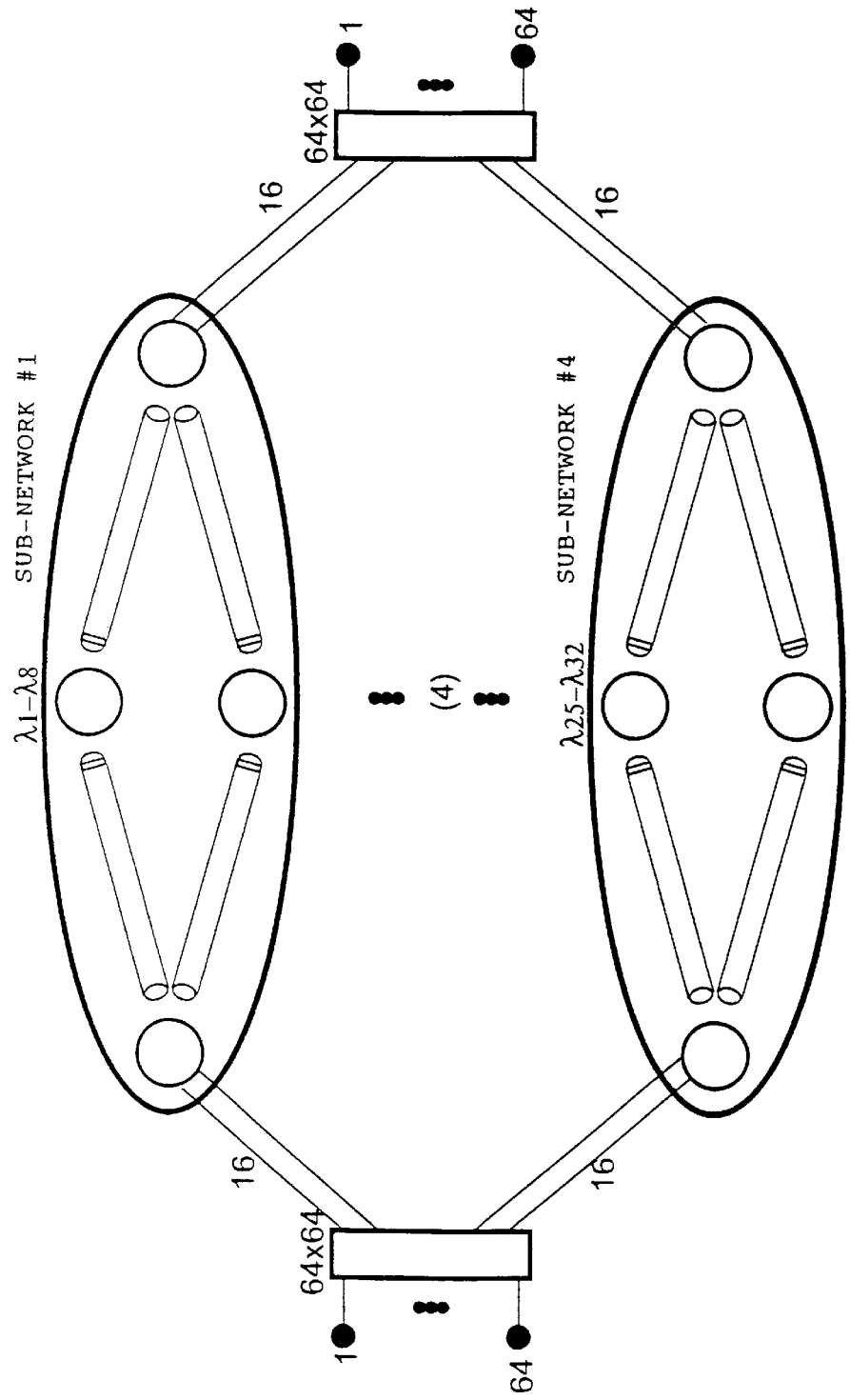
FIG. 16 is an explanatory diagram explaining the optical path network of the embodiment 1.

FIG. 16 is a conceptional diagram of an optical path network in an optical network established when the optical XC device according to the embodiment 1 of the present invention is employed. As indicated in this drawing, the optical path network is constituted by 4 sets of wavelength converting type sub-networks #1 ($\lambda 1$ to $\lambda 8$) to #4 ($\lambda 25$ to $\lambda 32$) in a unit of 8 wavelengths in this embodiment. With respect to a single optical path, a single sub-network is selected between a sender and a receiver node, and the wavelengths are allocated within this sub-network in a link-by-link basis.

Figure 17:
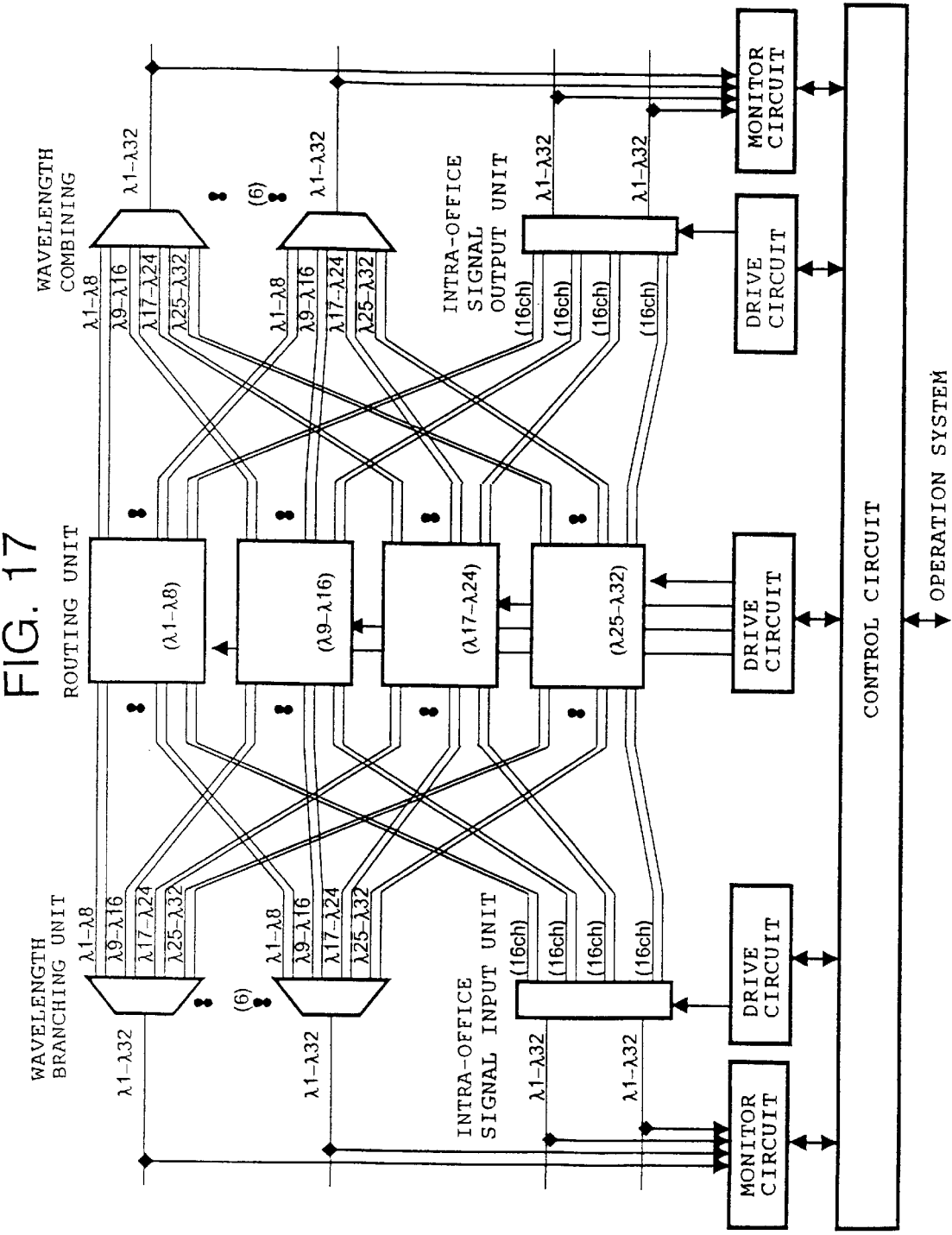
FIG. 17 is an explanatory diagram explaining the monitor/control system of the embodiment 1.

FIG. 17 shows an arrangement of a network equipped with a monitor/control system based on the optical XC device shown in FIG. 4 according to the present invention.

As shown in FIG. 17, the monitor/control system according to this embodiment is arranged by a monitor circuit, a drive circuit for driving an intra-office signal input unit, another drive circuit for driving a routing unit, another drive circuit for driving an intra-office signal output unit, and a further monitor circuit. The first-mentioned monitor circuit monitors both an optical transmission line between input offices and an intra-input office optical transmission line. The last-mentioned monitor circuit monitors both an optical transmission line output office and an intra-office transmission line.

Then, these monitor circuits and drive circuits are controlled by a control circuit.

In this drawing, upon receipt of path setting signals (for example, input optical link number, input wavelength value, output optical link number, output wavelength value) entered from an operation system, the control circuit analyzes control points of optical switches of the intra-office signal input unit, the routing unit, and the intra-office signal output unit based on the path setting signals.

Then, the control circuit sends out a control signal to a drive circuit of an optical switch, and this drive circuit produces a drive signal based on this control signal to send out the produced drive signal.

Also, in the input/output links of the optical XC device, the monitor circuits monitor both characteristics and path connections as to both an input wavelength-multiplexed optical signal and an output wavelength-multiplexed optical signal. Then, the monitor circuits continuously notify the monitoring results to the control circuit. When the control circuit judges an occurrence of an abnormal state, this control circuit notifies this abnormal state to the operation system.

Operations of First Optical XC Device

Figure 18:
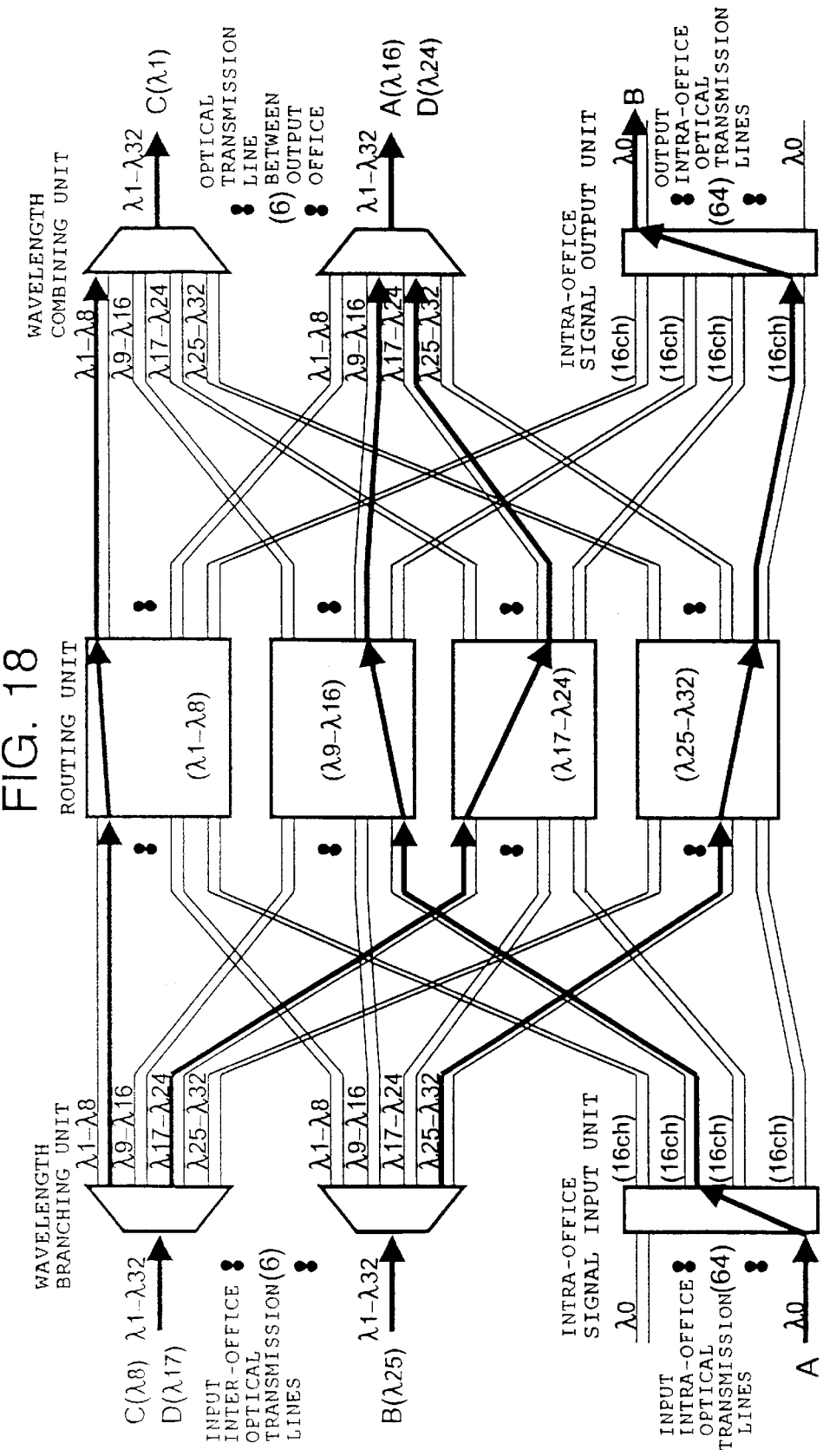
FIG. 18 is an explanatory diagram explaining the routing operation of the optical XC device of the embodiment 1.
Figure 20:
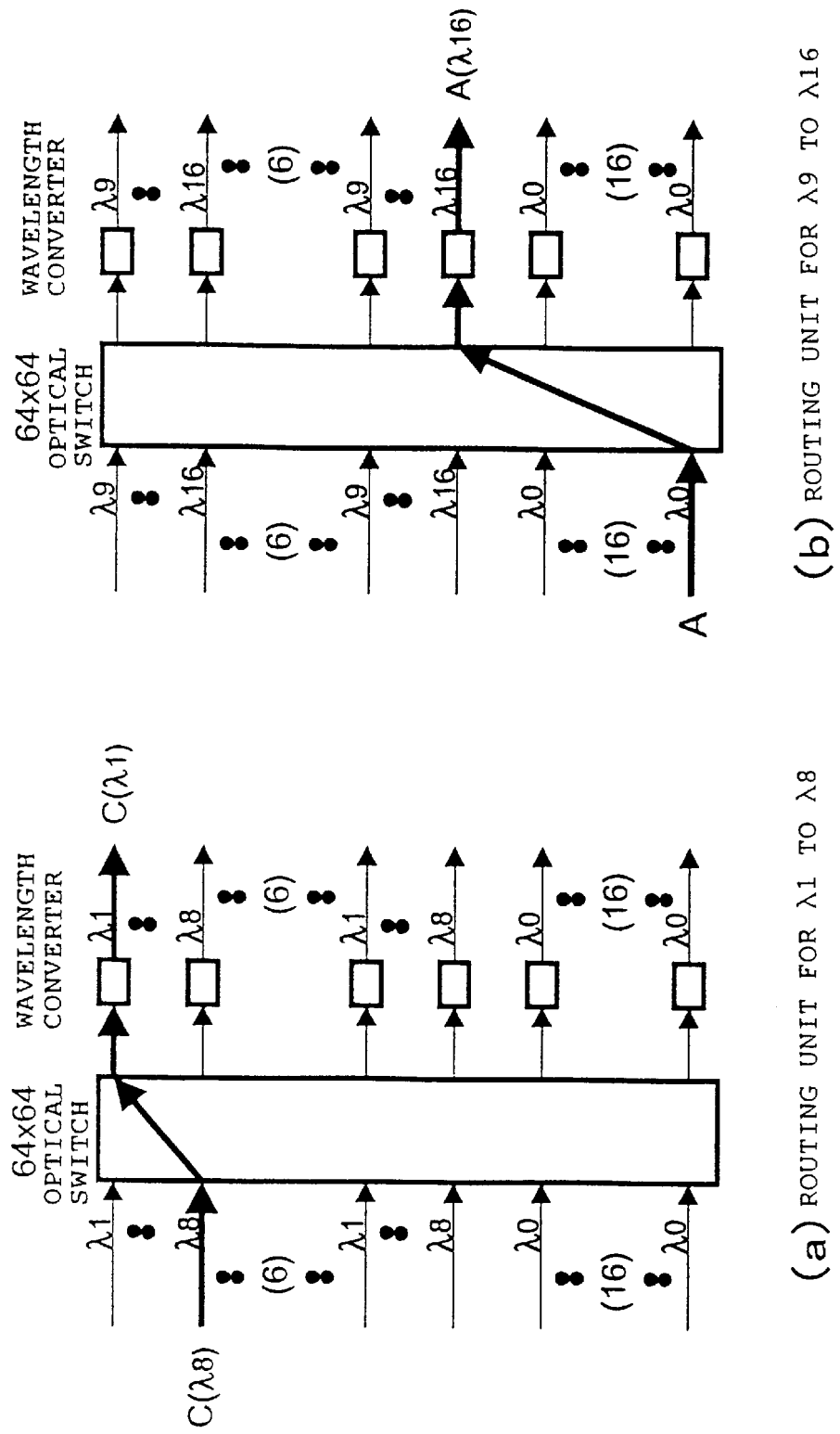
FIG. 20 is an explanatory diagram (2) for explaining the switching operation of the optical switch according to the embodiment 1.
Figure 21:
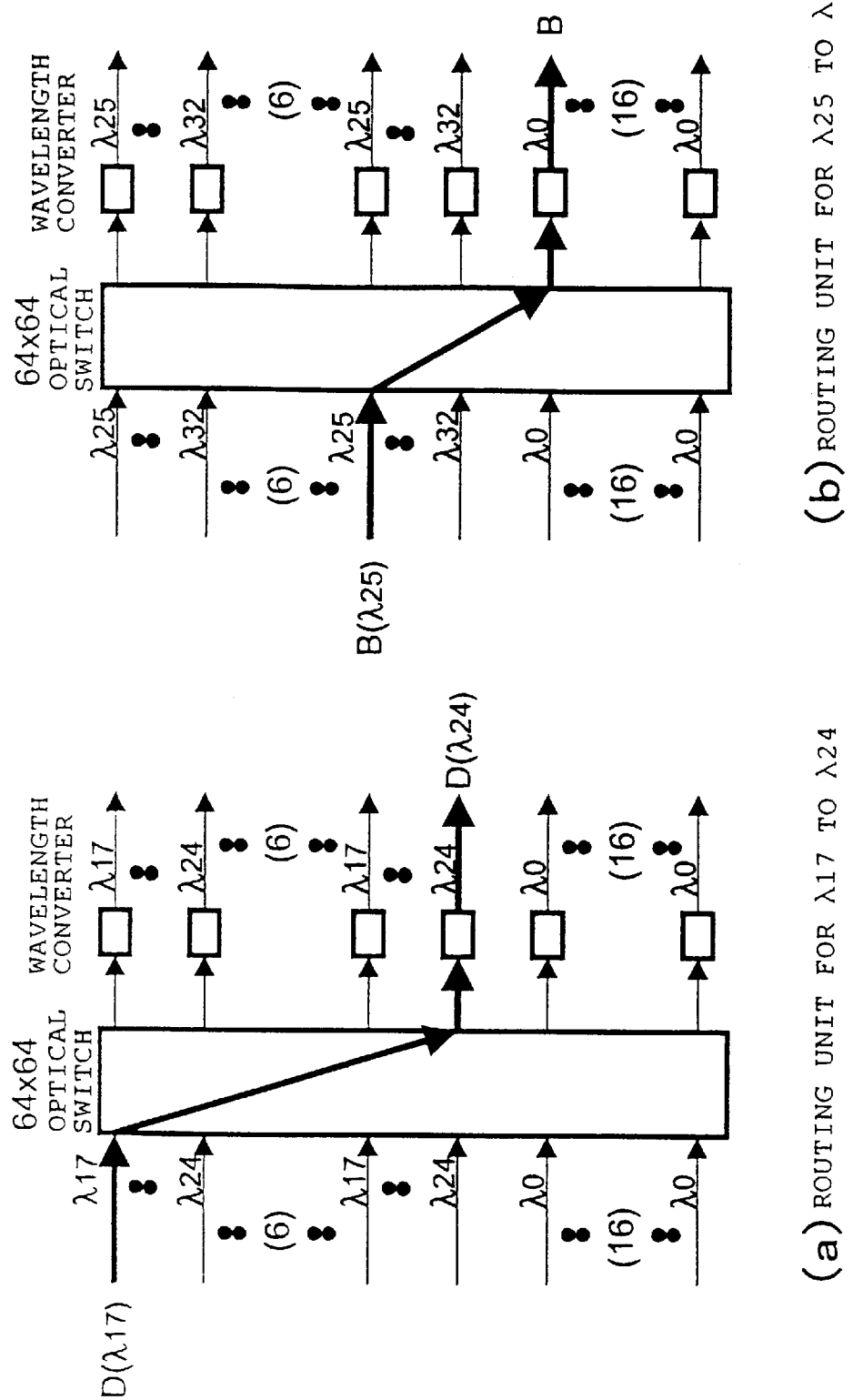
FIG. 21 is an explanatory diagram (3) for explaining the switching operation of the optical switch according to the embodiment 1.

FIG. 18 is an explanatory diagram for explaining an operation example of the optical XC device according to the embodiment 1. Also, FIG. 19 to FIG. 21 represent operation examples of the respective units based on the operation example of FIG. 18.

First, as shown in FIG. 19(a), an optical signal A ($\lambda 0$) entered from the intra-input office optical transmission line #64 is entered via the first optical line ($\lambda 0$) to the routing unit ($\lambda 9$ to $\lambda 16$) in the intra-office signal input unit (see FIG. 20(b)), and is further converted into an optical signal having a wavelength of "16" by the wavelength converter. The optical signal having the wavelength of $\lambda 16$ is routed via a wavelength combining unit to the optical transmission line between output office.

Also, another optical signal B ($\lambda 25$) supplied from the optical transmission line between input offices #6 is inputted via the first optical line ($\lambda 25$ to $\lambda 32$) separated from the wavelength branching unit into the routing unit for $\lambda 25$ to $\lambda 32$ (see FIG. 21(b)). The wavelength $\lambda 25$ of this optical signal B is converted into the wavelength $\lambda 0$ by the wavelength converter of this routing unit. Then, the converted optical signal having the wavelength $\lambda 0$ is routed via the second optical line ($\lambda 0$) from the intra-office signal output unit to the intra-output office optical transmission line #1 (see FIG. 19(b)).

Also, another optical signal C ($\lambda 8$) supplied from the optical transmission line between input offices #1 is inputted via the first optical line ($\lambda 1$ to $\lambda 8$) separated from the wavelength branching unit into the routing unit for $\lambda 1$ to $\lambda 8$ (see FIG. 20(a)). The wavelength $\lambda 8$ of this optical signal C is converted into the wavelength $\lambda 1$ by the wavelength converter of this routing unit. Then, the converted optical signal having the wavelength $\lambda 1$ is routed via the second optical line ($\lambda 1$ to $\lambda 8$) from the wavelength combining unit to the intra-output office transmission line #1.

Also, another optical signal D ($\lambda 17$) supplied from the optical transmission line between input offices #1 is inputted via the first optical line ($\lambda 17$ to $\lambda 24$) separated from the wavelength branching unit into the routing unit for $\lambda 17$ to $\lambda 24$ (see FIG. 21(a)). The wavelength $\lambda 17$ of this optical signal D is converted into the wavelength $\lambda 24$ by the wavelength converter of this routing unit. Then, the converted optical signal having the wavelength $\lambda 24$ is routed via the second optical line ($\lambda 17$ to $\lambda 24$) from the wavelength combining unit to the intra-output office optical transmission line #6.

Arrangement of Second Optical XC Device

Figure 5:
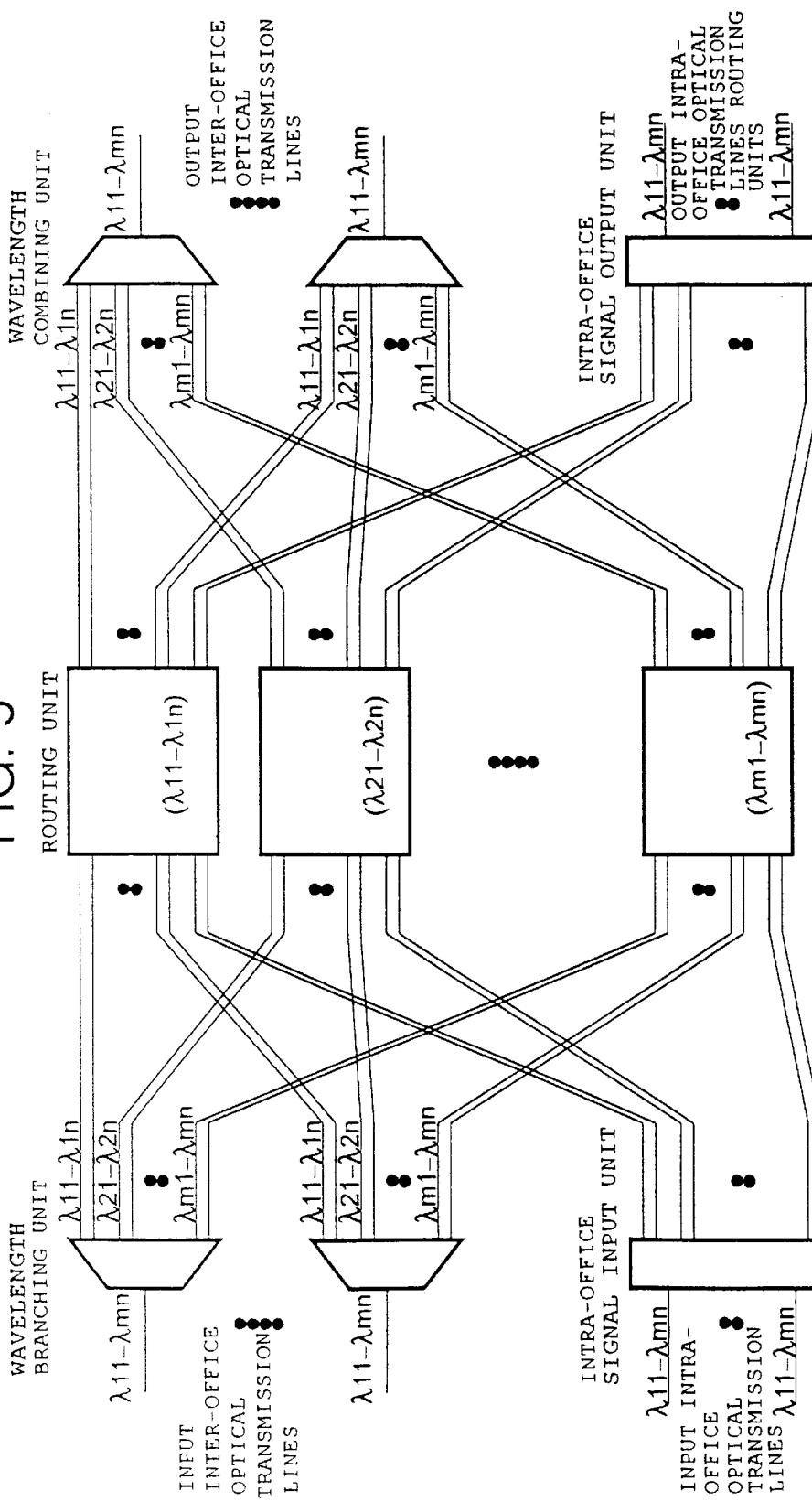
FIG. 5 illustratively shows a basic structural diagram of an optical XC device according to an embodiment 2 of the present invention.

FIG. 5 is a diagram for showing an arrangement of an optical line XC device according to an embodiment 2 of the present invention.

Figure 9:
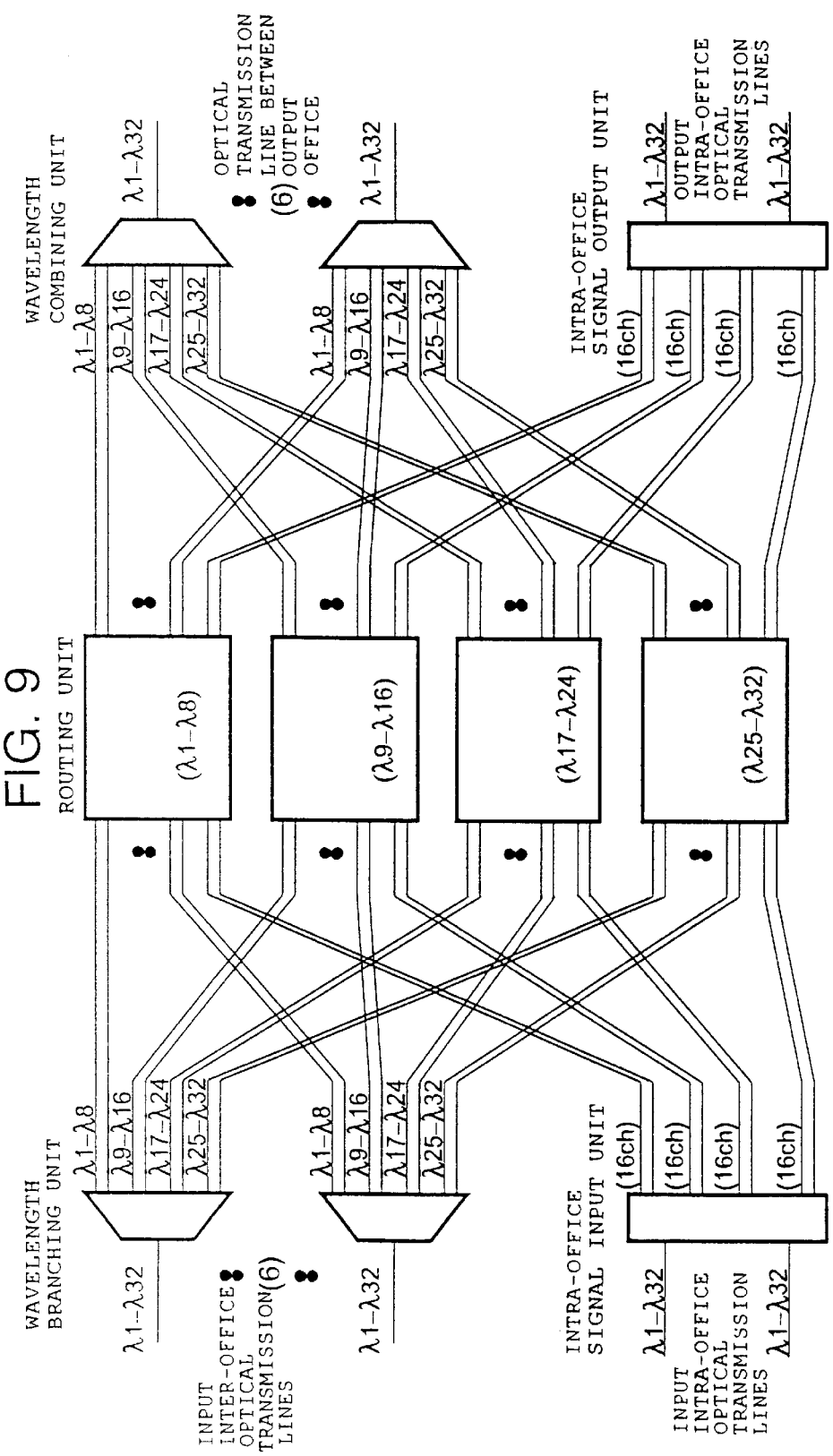
FIG. 9 is a concrete structural diagram explaining the routing operation by the optical XC device of the embodiment 2.
Figure 13:
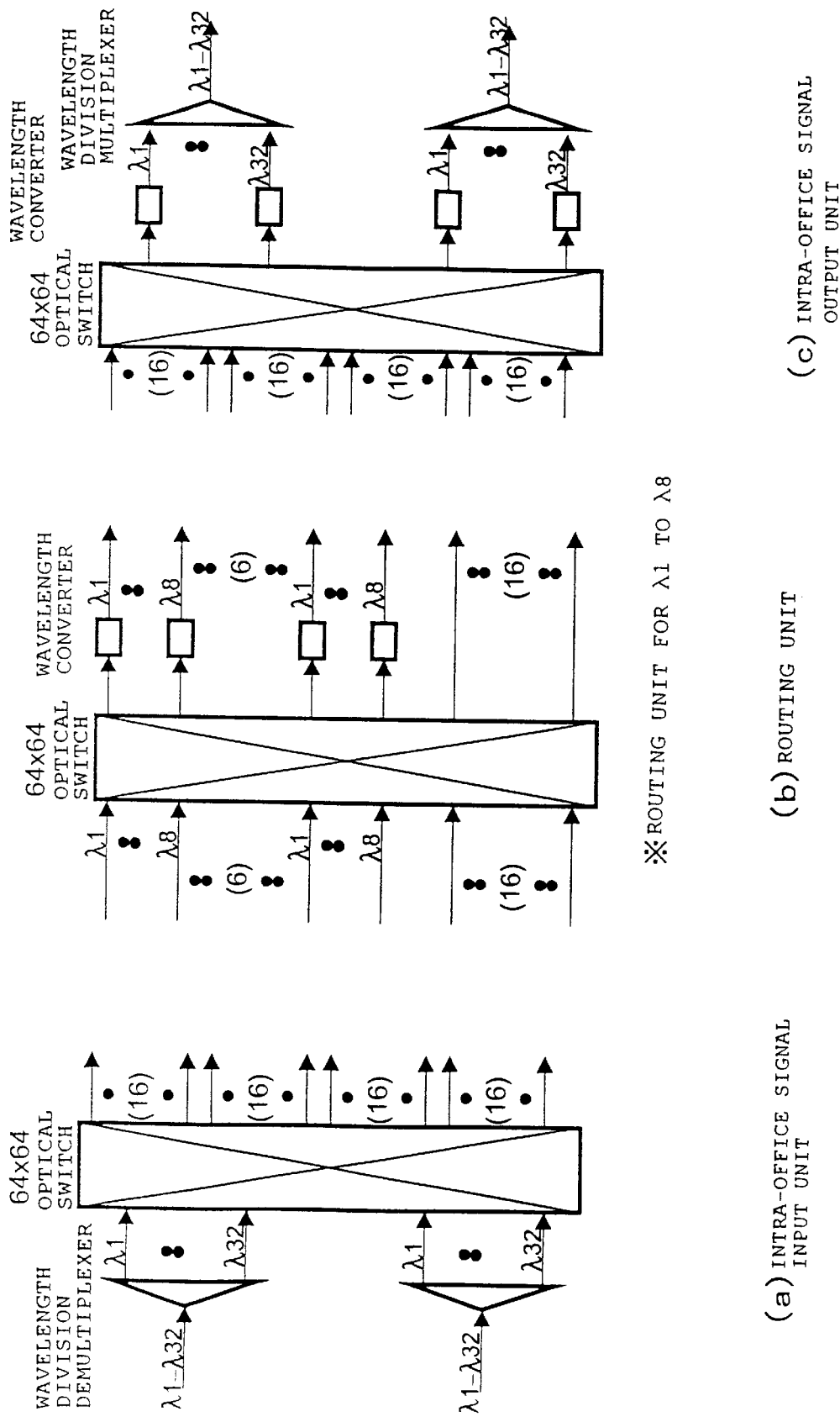
FIG. 13 illustratively represents structural drawings of the respective units employed in the optical XC device of the embodiment 2.

Also, FIG. 13 indicates an arrangement of an intra-office signal input unit, an arrangement of a routing unit, and an arrangement of an intra-office signal output unit. Furthermore, FIG. 9 represents a concrete arrangement of the routing unit in this embodiment 2.

This embodiment 2 has a feature that optical signals are wavelength-multiplexed in the intra-office transmission line, as compared with the embodiment 1 shown in FIG. 4. Other arrangements of this embodiment 2 are the same as those of the embodiment 1.

As shown in this drawing, the intra-office signal input unit is constituted by 64×64 optical switches and wavelength-division demultiplexer, and the routing unit is constituted by 64×64 optical switches and a wavelength converter. In this case, this wavelength converter is equipped with only the optical transmission line between output offices. An output wavelength of this wavelength converter corresponds to a wavelength allocated to each of the respective routing units. Also, the intra-office signal output unit is arranged by 64×64 optical switches, a wavelength converter, and a wavelength-division multiplexer. It should be understood that a concrete structure of an optical switch is similar to that shown in FIG. 22.

In this case, the above-described wavelength branching unit distributes 32 wavelength components to 4 sets of routing units ($\lambda 1$ to $\lambda 8$), ($\lambda 9$ to $\lambda 16$) ($\lambda 17$ to $\lambda 24$), and ($\lambda 25$ to $\lambda 32$) in a unit of 8 wavelengths.

In this embodiment 2, the inter-office optical signals entered into the wavelength branching unit are 32×6=192 channels, and the intra-office optical signals entered into the intra-office signal input unit are 32×2=64 channels.

The intra-office signal input unit distributes the wavelength-multiplexed optical signals entered from the intra-input office optical transmission line to the respective desirable routing units. Then, the intra-office signal output unit distributes the optical signals which are entered thereinto from the respective routing units to the desirable intra-output station optical transmission line having the desirable wavelengths, respectively.

Arrangement of Third Optical XC Device

Figure 6:
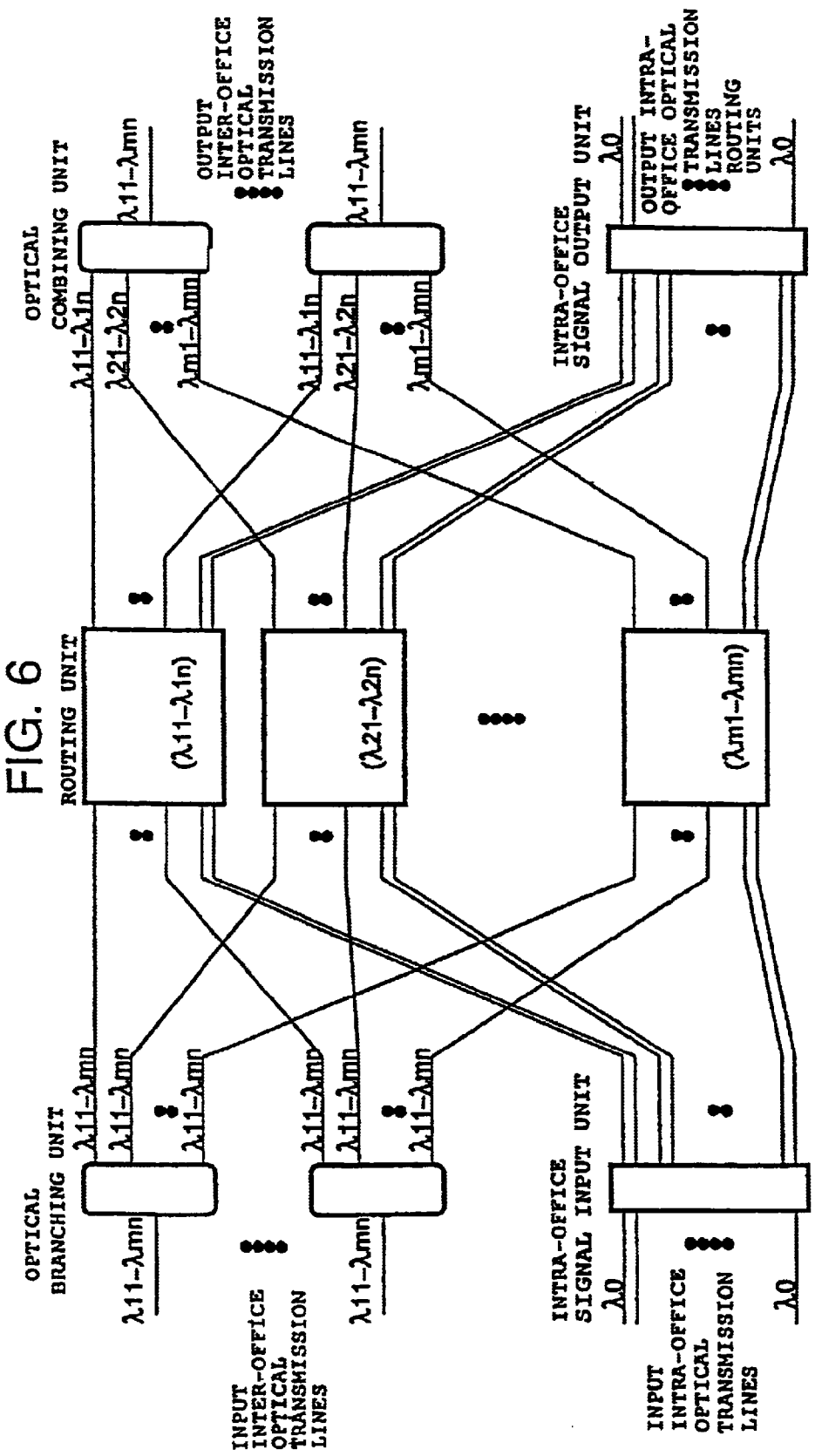
FIG. 6 illustratively shows a basic structural diagram of an optical XC device according to an embodiment 3 of the present invention.

FIG. 6 is a diagram showing an arrangement of an optical XC device according to an embodiment 3.

As indicated in FIG. 6, the optical XC device, according to the embodiment 3, is arranged by an optical branching unit provided every optical transmission line between input offices; "m(m>1)" pieces of routing units subdivided in a unit of "n (n>1)" wavelengths; an optical combining unit provided every optical transmission line between output offices; an intra-office signal input unit provided with respect to an intra-input office optical transmission line (without wavelength multiplexing); and an intra-office signal output unit with respect to an intra-output office optical transmission line (without wavelength multiplexing).

The optical branching unit has such a function that while maintaining a wavelength-multiplexed optical signal entered from the intra-input office optical transmission line under wavelength multiplexing state, this wavelength-multiplexed optical signal is distributed to "m" pieces of routing units.

The routing unit has such a function that an optical signal within a pre-allocated wavelength range among the wavelength-multiplexed optical signals entered via the optical branching unit, and also an optical signal entered from the intra-office signal input unit are converted into desirable wavelengths, and then, the optical signals having the converted wavelengths are routed to a desirable optical combining unit, or to the intra-office signal output unit.

The optical combining unit has such a function capable of combining the wavelength-multiplexed optical signals having the different wavelengths which are inputted from the respective routing units.

Furthermore, the intra-office signal input unit has such a function capable of distributing the optical signals entered from the intra-input office optical transmission line to desirable routing units. Then, the intra-office signal output unit has such a function capable of distributing the optical signals entered from the respective routing units to the desirable intra-output office optical transmission line.

Figure 14:
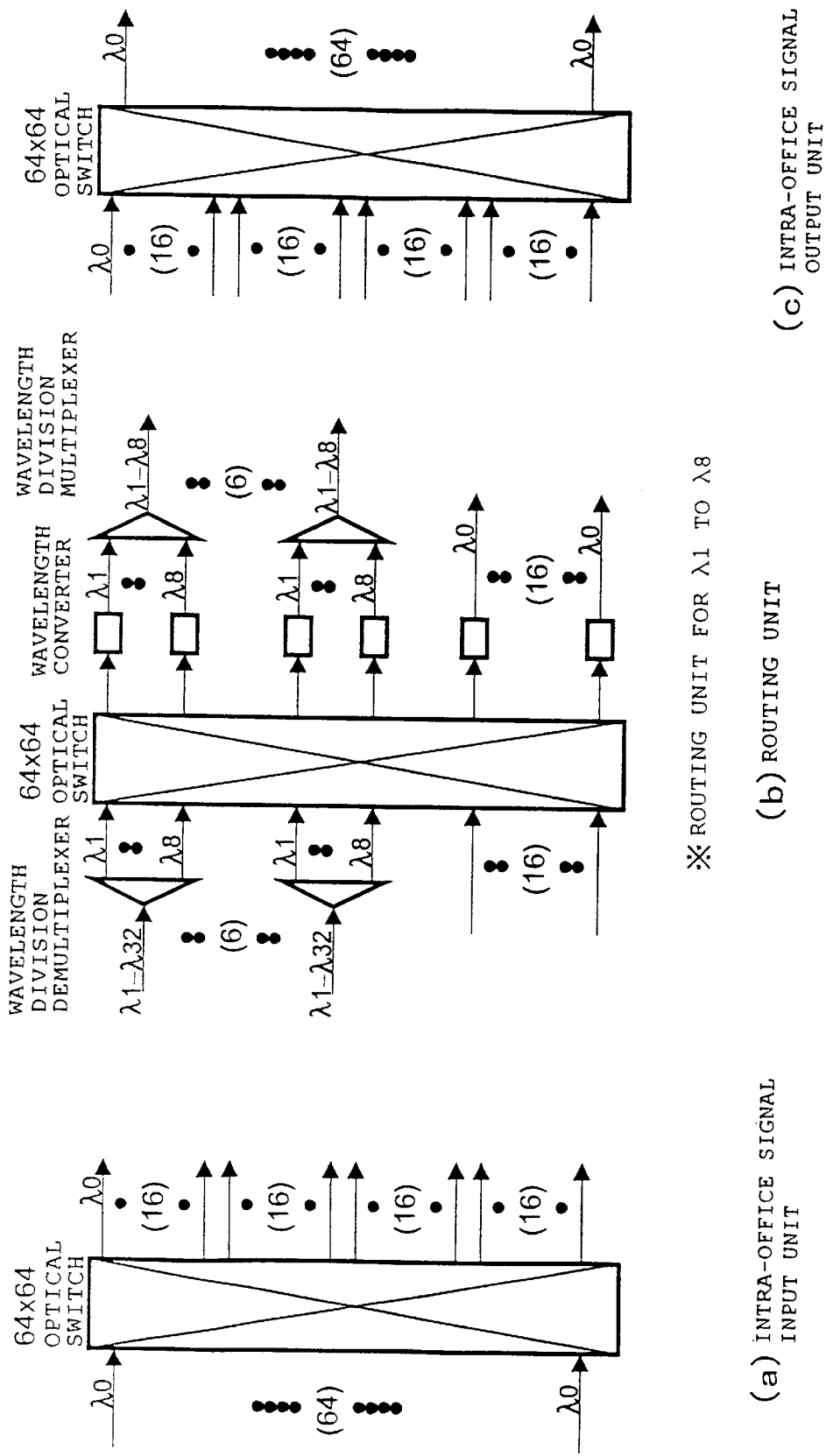
FIG. 14 illustratively represents structural drawings of the respective units employed in the optical XC device of the embodiment 3.

FIG. 14 shows structural examples of the respective units provided in the optical XC device according to this embodiment 3. As indicated in this drawing, the intra-office signal input unit is constituted by 64×64 optical switches. The routing unit is arranged by 64×64 optical switches, a wavelength-division demultiplexer, a wavelength-division multiplexer, and wavelength converters. In the wavelength converters, the output wavelengths of the optical signals sent out to the optical transmission line between the output offices correspond to the wavelengths allocated to the respective routing units, and all of the output wavelengths of the optical signals sent out to the intra-output office optical transmission lines are equal to each other. The wavelength-division demultiplexer is provided with an input port connected to the optical branching unit, and demultiplexes the optical signal within the wavelength range allocated to the respective routing units. The wavelength-division multiplexer is provided with an output port connected to the optical combining unit. The inter-office signal output unit is constructed by 64×64 optical switches.

Figure 10:
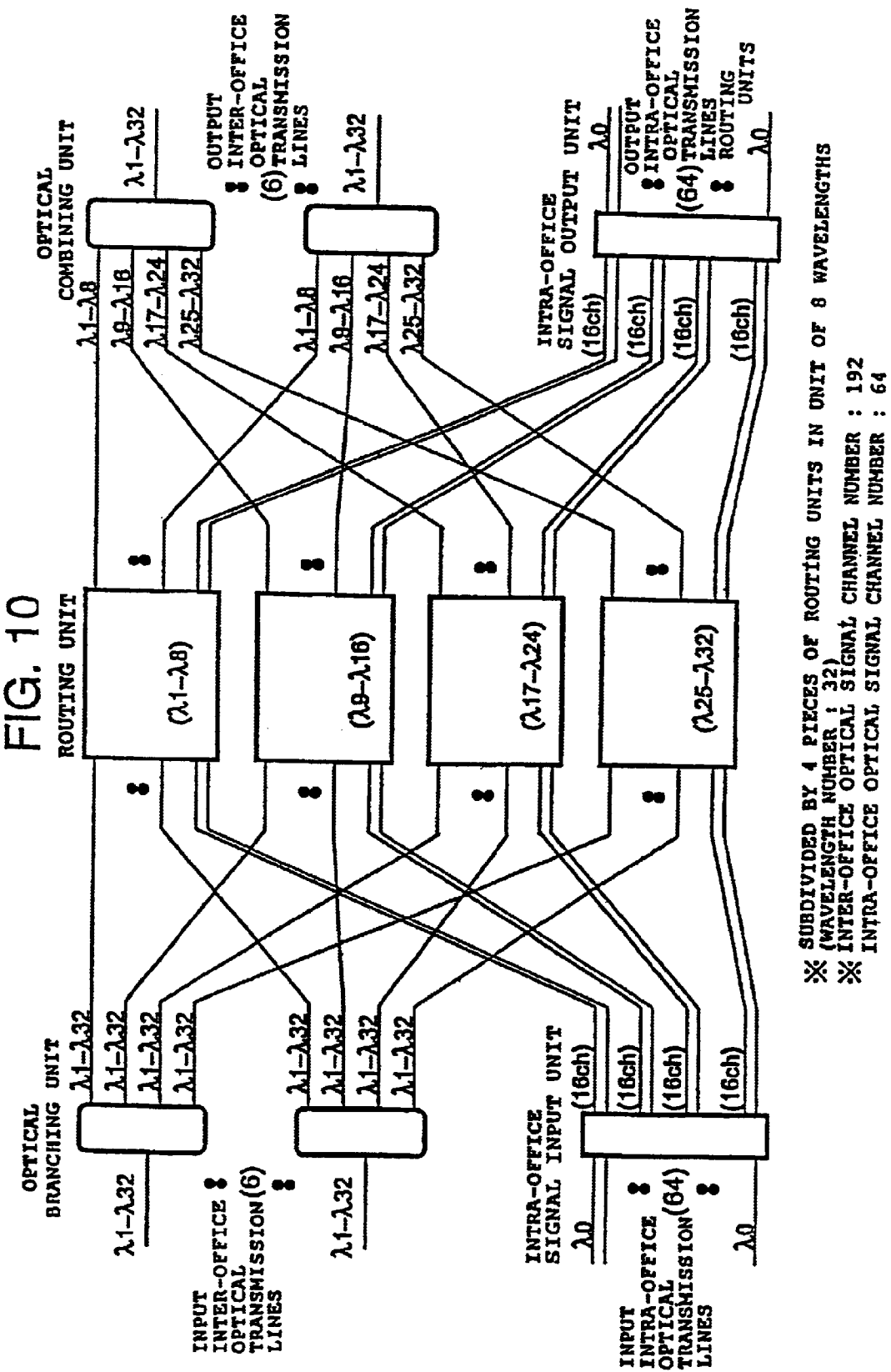
FIG. 10 is a concrete structural diagram explaining the routing operation by the optical XC device of the embodiment 3.

FIG. 10 is a diagram indicating a more detailed routing operation by this optical XC device.

As indicated in this drawing, in the concrete cross-connect device of this embodiment 3, a total number of wavelengths on the input side is 32, and then, these 32 wavelengths are distributed to 4 sets of routing units in a unit of 8 wavelengths. A ratio of the optical signal channel number derived from the optical transmission line (inter-office) to the optical signal channel number derived from the intra-office transmission line is set to 3:1. As a result, a total channel number of the intra-office optical signals is 32×6= 192, whereas a total channel number of the inter-office optical signals is 32×2=64.

Arrangement of Fourth Optical XC Device

Figure 7:
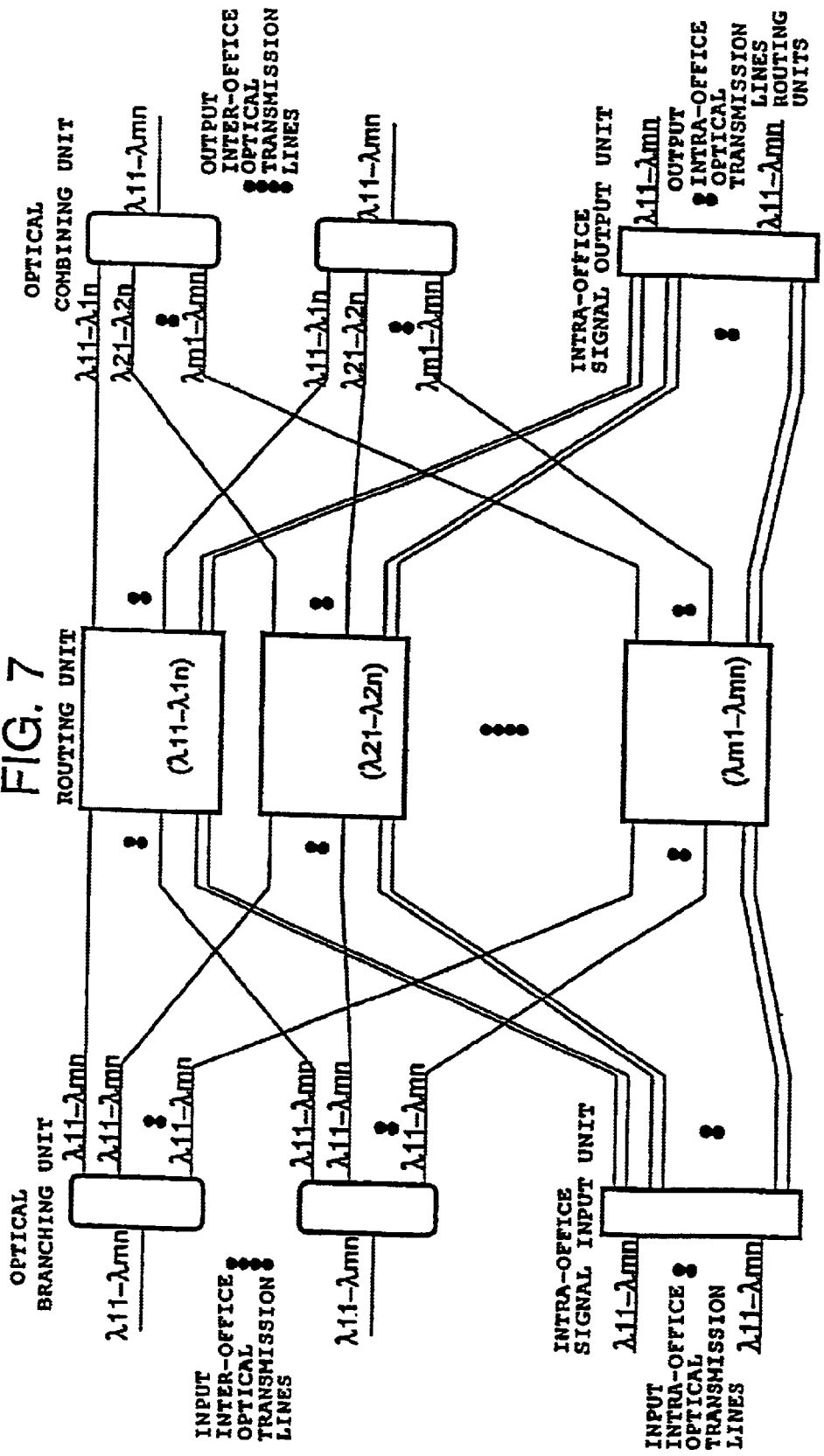
FIG. 7 illustratively shows a basic structural diagram of an optical XC device according to an embodiment 4 of the present invention.

FIG. 7 is a diagram showing an arrangement of an optical XC device according to an embodiment 4.

In comparison with the device arrangement of the embodiment 3 shown in FIG. 6, the optical XC device of this embodiment 4 is characterized in that an optical signal is wavelength-multiplexed in an intra-office transmission line. Other arrangements of this optical XC device are similar to those of the above-explained embodiment 3.

As indicated in this drawing, the optical XC device, according to the embodiment 4, is arranged by an optical branching unit provided every optical transmission line between input offices; "m(m>1)" pieces of routing units subdivided in a unit of "n(n>1)" wavelengths; an optical combining unit provided every optical transmission line between output offices; an intra-office signal input unit provided with respect to an intra-input office optical transmission line (with wavelength multiplexing); and an inter-office signal output unit with respect to an intra-output office optical transmission line (with wavelength multiplexing).

The optical branching unit has such a function that while maintaining a wavelength-multiplexed optical signal entered from the intra-input office optical transmission line under wavelength multiplexing state, this wavelength-multiplexed optical signal is distributed to "m" pieces of routing units.

The routing unit has such a function that an optical signal within a pre-allocated wavelength range among the wavelength-multiplexed optical signals entered via the optical branching unit, and also an optical signal entered from the intra-office signal input unit is converted into desirable wavelengths, and then, the optical signals having the converted wavelengths are routed to a desirable optical combining unit, or to the intra-office signal output unit.

The optical combining unit has such a function capable of combining the wavelength-multiplexed optical signals having the different wavelengths which are inputted from the respective routing units.

Furthermore, the intra-office signal input unit has such a function capable of distributing the wavelength-multiplexed optical signals entered from the intra-input office optical transmission line to desirable routing units. Then, the intra-office signal output unit has such a function capable of distributing the optical signals entered from the respective routing units to the desirable wavelength and to the desirable intra-output station optical transmission line.

Figure 15:
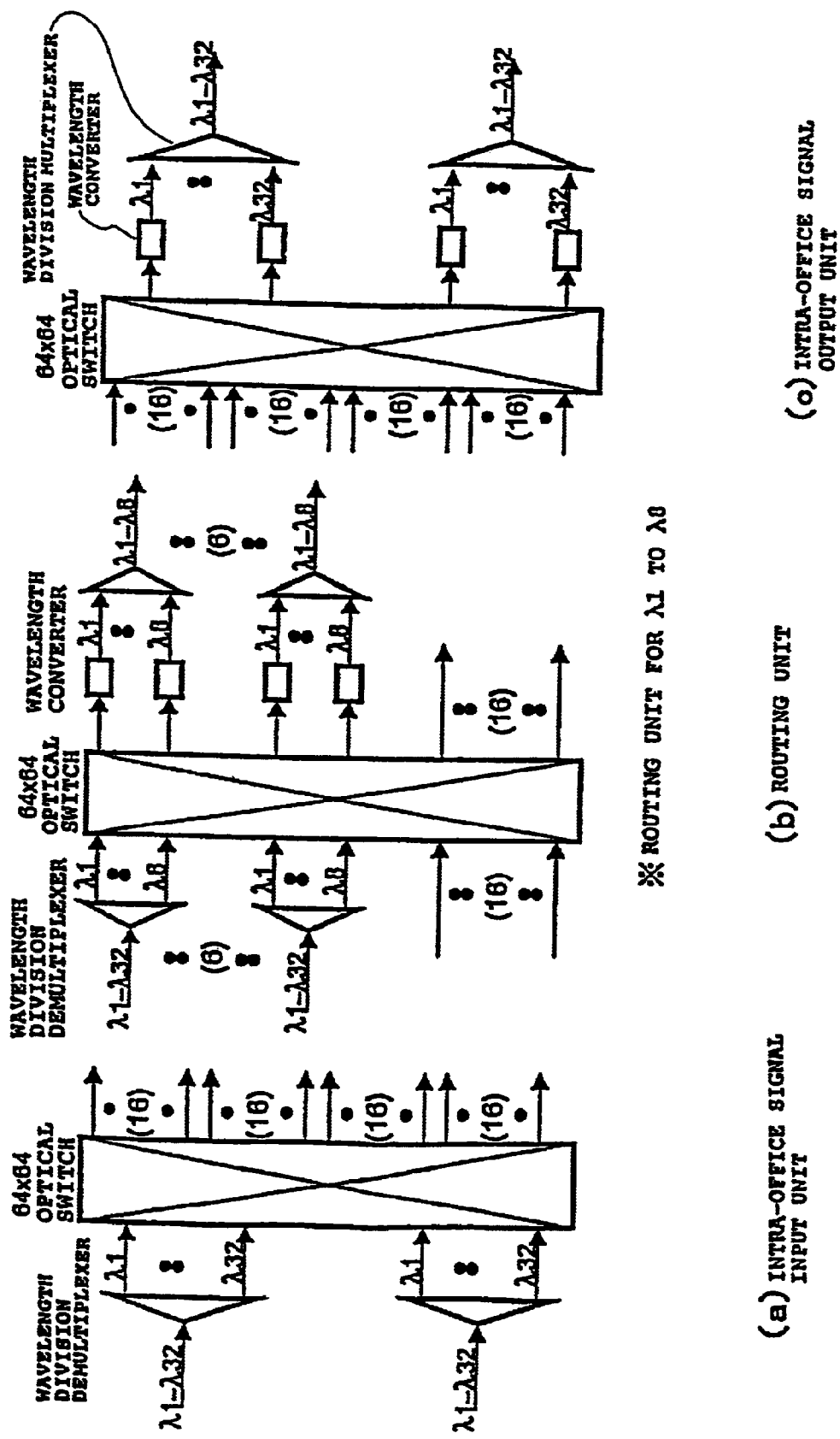
FIG. 15 illustratively represents structural drawings of the respective units employed in the optical XC device of the embodiment 4.

FIG. 15 shows structural examples of the respective units provided in the optical XC device according to this embodiment 4.

That is to say, the intra-office signal input unit is constituted by 64×64 optical switches and a wavelength-division demultiplexer. The routing unit is arranged by 64×64 optical switches, a wavelength-division demultiplexer, a wavelength-division multiplexer, and wavelength converters. The wave length converters are provided only on the side of the optical transmission line between the output offices, and the output wavelengths of the optical signals correspond to the wavelengths allocated to the respective routing units. The wavelength-division demultiplexer is provided with an input port connected to the optical branching unit, and demultiplexes the optical signal within the wavelength range allocated to the respective routing units. The wavelength-division multiplexer is provided with an output port connected to the optical combining unit.

Furthermore, the intra-office signal output unit is arranged by 64×64 optical switches, a wavelength converter, and a wavelength-division multiplexer.

To avoid degradation of a transfer characteristic of an optical signal, a regenerator (arranged by opto-electric converter and electric-optical converter) may be provided at either an input of an optical switch or an output thereof in the above-explained intra-office signal input unit and intra-office signal output unit.

Figure 11:
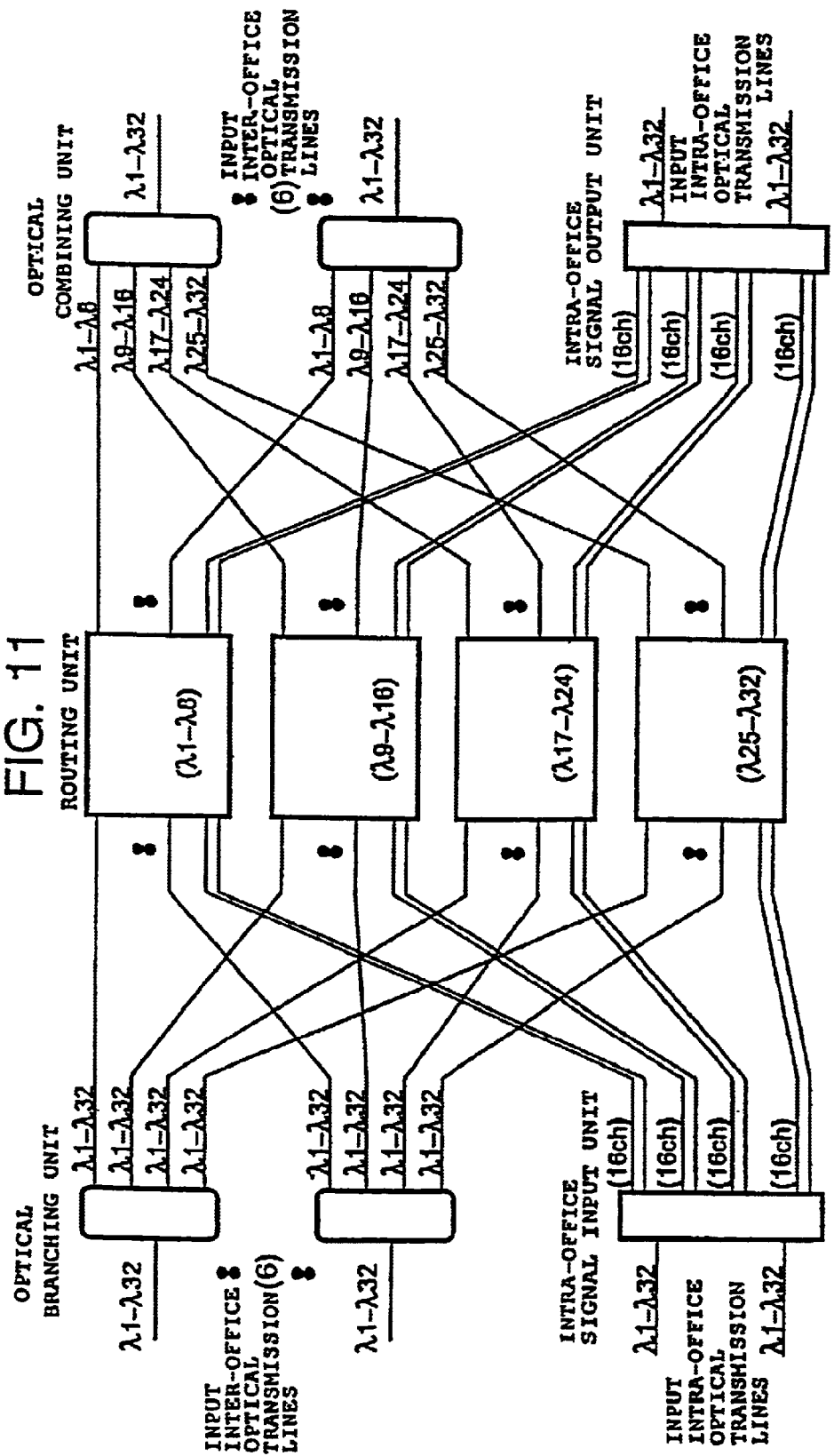
FIG. 11 is a concrete structural diagram explaining the routing operation by the optical XC device of the embodiment 4.

FIG. 11 is a diagram indicating a more detailed routing operation by this optical XC device of the embodiment 4.

As indicated in this drawing, in the concrete cross-connect device of this embodiment 4, a total number of wavelengths on the input side is 32, and then, these 32 wavelengths are distributed to 4 sets of routing units in a unit of 8 wavelengths. A ratio of the optical signal channel number derived from the optical transmission line (inter-office) to the optical signal channel number derived from the inter-office transmission line is set to 3:1. As a result, a total channel number of the inter-office optical signals is 32×6= 192, whereas a total channel number of the intra-office optical signals is 32×2=64.

It should be understood in this specification that the routing unit, the intra-office signal input unit, the intra-office signal output unit, and the optical switch are not limited to the above-explained structural examples.

As previously explained in detail, in accordance with the present invention, a single sub-network is constituted by the wavelength converting type routing unit in the unit of extension. Then, the wavelength converting type routing units are successively added in response to an increase in the wavelength numbers (namely, a plurality of sub-networks are additionally provided) so as to constitute a large-scaled optical XC device and an optical network. As a consequence, while maintaining the transfer characteristic, these optical XC device and optical network have the expanding characteristic with respect to the wavelength number. Furthermore, it can prevent the large-scaled system. This may contribute to an improvement in the performance of the optical transfer system with employment of this arrangement.

What is claimed is:

1. An optical path cross-connect device for accommodating an inter-office transmission line for transferring wavelength-multiplexed optical signals and a plurality of intra-office transmission lines for transferring a wavelength-non-multiplexed optical signal, comprising:

an optical branching unit provided with said inter-office transmission line, for branching the wavelength-multiplexed optical signals entered from said inter-office transmission line into "m (symbol "m" being an integer and also being larger than 1)" pieces of first optical path groups, while maintaining wavelength-multiplexed state;

an intra-office signal input unit provided with said intra-office transmission lines, for repeating the wavelength-non-multiplexed optical signal entered from each of said intra-office optical transmission lines;

"m" pieces of routing units for routing an optical signal within a pre-allocated wavelength range from optical signals outputted from said optical branching unit and said intra-office signal input unit to an intra-office signal output unit, and for converting said optical signal within said pre-allocated wavelength range into a desirable wavelength to route a wavelength-converted optical signal to a second optical path group, said "m (symbol "m" being an integer and also being larger than 1)" pieces of routing units being subdivided in a unit of at least "n (symbol "n" being an integer and also being larger than 1)" wavelengths as wavelength ranges to be processed by the respective routing unit are different from each other;

an optical combining unit for accommodating thereinto said second optical path group and for selectively wavelength-multiplexing said wavelength-converted optical signal; and an intra-office signal output unit for accommodating thereinto said second optical path group and for selectively repeating said wavelength-converted optical signals, wherein:

said intra-office signal input unit is constituted by an optical space switch; said routing unit is arranged by a wavelength-division demultiplexer, an optical space switch, a wavelength converter and a wavelength-division multiplexer; and said intra-office signal output unit is arranged by an optical space switch.

2. An optical path cross-connect device as claimed in claim 1, wherein: the optical signal transferred to said intra-office transmission lines is wavelength-multiplexed; and both said intra-office signal input unit and said intra-office signal output unit repeat the wavelength-multiplexed optical signal.

3. An optical path cross-connect device as claimed in claim 2 wherein:

said intra-office signal input unit is arranged by a wavelength-division demultiplexer and an optical space switch; said routing unit is constituted by a wavelength-division demultiplexer, an optical space switch, a wavelength converter and a wavelength-division multiplexer; and said intra-office signal output unit is arranged by an optical space switch, a wavelength converter and a wavelength-division multiplexer.

4. An optical network wherein:

a plurality of optical path cross-connect devices as claimed in claim 1 are employed so as to constitute said optical network.

* * * * *

UNITED STATES PATENT AND TRADEMARK OFFICE
CERTIFICATE OF CORRECTION

PATENT NO. : 7,043,158 B1 Page 1 of 1
APPLICATION NO. : 09/467972
DATED : May 9, 2006
INVENTOR(S) : Satoshi Kuroyanagi et al.

It is certified that error appears in the above-identified patent and that said Letters Patent is hereby corrected as shown below:

On Title page item 56
First Page Column 2 (Other Publications), Line 1, change "Reason Of For REjection dated" to --of Reason for Rejection; Dated--.

On Title page item 56
First Page Column 2 (Other Publication), Line 3, change "10-368805" to --10-358805--.

On Title page item 56
First Page Column 2 (Abstract), Line 2, change "intra office" to --intra-office--.

On Title page item 56
First Page Column 2 (Abstract), Line 10, after "than 1)" delete " " ".

Column 12, Line 31, change "signals," to --signal,--.

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,043,158 B1  Page 1 of 1
APPLICATION NO. : 09/467972
DATED : May 9, 2006
INVENTOR(S) : Kuroyanagi et al.

It is certified that error appears in the above-identified patent and that said Letters Patent is hereby corrected as shown below:

On the title page (item 56)

First page, Col. 2 (other Publication), line 3, change "10-358805" to --10-368805--

Signed and Sealed this

Twenty-seventh Day of February, 2007

JON W. DUDAS
*Director of the United States Patent and Trademark Office*